(12) United States Patent
Gabryjelski et al.

(10) Patent No.: US 11,789,597 B2
(45) Date of Patent: Oct. 17, 2023

(54) SYSTEMS AND METHODS FOR STORING REFERENCES TO ORIGINAL UNIFORM RESOURCE IDENTIFIERS

(71) Applicant: Microsoft Technology Licensing, LLC, Redmond, WA (US)

(72) Inventors: Henry Gabryjelski, Sammamish, WA (US); Michael Paul Calligaro, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/157,632

(22) Filed: Jan. 25, 2021

(65) Prior Publication Data

US 2022/0236858 A1     Jul. 28, 2022

(51) Int. Cl.
*G06F 3/04842*     (2022.01)
*H04L 67/02*     (2022.01)

(52) U.S. Cl.
CPC .......... *G06F 3/04842* (2013.01); *H04L 67/02* (2013.01)

(58) Field of Classification Search
CPC .............................. G06F 3/04842; H04L 67/02
See application file for complete search history.

(56) References Cited

U.S. PATENT DOCUMENTS

| | | | | |
|---|---|---|---|---|
| 6,037,934 A * | 3/2000 | Himmel | .............. | G06F 16/9562 715/760 |
| 6,041,360 A * | 3/2000 | Himmel | .............. | G06F 16/9562 709/245 |
| 6,275,862 B1 * | 8/2001 | Sharma | .............. | G06F 16/9562 709/245 |
| 6,948,118 B2 * | 9/2005 | Genty | .............. | G06F 16/9562 715/207 |
| 7,177,901 B1 * | 2/2007 | Dutta | .............. | H04L 67/1002 709/203 |
| 7,783,979 B1 * | 8/2010 | Leblang | .............. | G06F 16/9566 715/739 |

(Continued)

FOREIGN PATENT DOCUMENTS

WO     2014098563 A1     6/2014

OTHER PUBLICATIONS

Hypertext Transfer Protocol—HTTP/1.1 RFC 2616 Fielding, et al. [retrieved from https://www.w3.org/Protocols/rfc2616/rfc2616-sec10.html] (Year: 2004).*

(Continued)

*Primary Examiner* — Jeremy L Stanley

(57) ABSTRACT

A user is enabled to generate and store a reference, such as a bookmark, to an original URI specified by the user, after the web browser has been redirected to a redirect URI. For example, the web browser may track each of the URIs to which the web browser has redirected after the user provides a URI to the web browser for navigation thereby. The web browser may analyze each of the URIs to determine which of the URIs is the original URI. When a user causes the web browser to generate the bookmark for the web page corresponding to the redirect URI, the determined original URI and/or redirect URI may be associated with the bookmark. The user may be provided an option to select one or both of the determined original URI and the redirect URI to be associated with the bookmark.

19 Claims, 12 Drawing Sheets

(56) References Cited

U.S. PATENT DOCUMENTS

| | | | | |
|---|---|---|---|---|
| 7,962,450 B2* | 6/2011 | Kruis | | G06F 16/9562 |
| | | | | 707/621 |
| 8,042,036 B1* | 10/2011 | Sharma | | G06F 16/9558 |
| | | | | 715/208 |
| 8,392,576 B1* | 3/2013 | Henderson | | G06F 16/9566 |
| | | | | 709/226 |
| 8,402,359 B1* | 3/2013 | Pogodin | | G06F 16/955 |
| | | | | 715/206 |
| 8,504,692 B1* | 8/2013 | Henderson | | G06F 16/9566 |
| | | | | 709/226 |
| 8,812,705 B1* | 8/2014 | Wang | | G06F 16/9537 |
| | | | | 709/229 |
| 8,832,578 B1* | 9/2014 | Shah | | G06F 9/543 |
| | | | | 715/770 |
| 9,389,931 B1* | 7/2016 | Bhudavaram | | G06F 16/192 |
| 9,454,285 B1* | 9/2016 | Cai | | H04L 67/00 |
| 9,720,889 B1* | 8/2017 | Kobyakov | | G06F 40/143 |
| 10,904,210 B2* | 1/2021 | Zhu | | H04L 61/1594 |
| 2002/0052934 A1* | 5/2002 | Doherty | | H04L 29/06 |
| | | | | 709/219 |
| 2002/0116411 A1* | 8/2002 | Peters | | G06F 16/9562 |
| | | | | 715/234 |
| 2002/0116525 A1* | 8/2002 | Peters | | G06F 16/9562 |
| | | | | 709/242 |
| 2003/0046290 A1* | 3/2003 | Yamada | | G06F 16/9562 |
| 2003/0144984 A1* | 7/2003 | Dunbar | | G06F 16/9562 |
| 2003/0188263 A1* | 10/2003 | Bates | | G06F 16/9562 |
| | | | | 715/206 |
| 2008/0072164 A1* | 3/2008 | Park | | G06F 40/143 |
| | | | | 715/762 |
| 2008/0091843 A1* | 4/2008 | Kulkarni | | G06F 16/9566 |
| | | | | 709/239 |
| 2008/0098039 A1* | 4/2008 | Kruis | | G06F 16/9562 |
| 2008/0109832 A1* | 5/2008 | Ozzie | | G06F 3/048 |
| | | | | 719/329 |
| 2008/0134018 A1* | 6/2008 | Kembel | | G06F 40/186 |
| | | | | 707/E17.119 |
| 2008/0172404 A1* | 7/2008 | Cohen | | G06F 16/9562 |
| 2008/0177994 A1* | 7/2008 | Mayer | | G06F 9/4418 |
| | | | | 713/2 |
| 2008/0263193 A1* | 10/2008 | Chalemin | | H04L 67/02 |
| | | | | 709/224 |
| 2008/0313206 A1* | 12/2008 | Kordun | | G06F 16/9562 |
| 2009/0240686 A1* | 9/2009 | Murali | | G06F 16/955 |
| 2011/0124319 A1* | 5/2011 | Fu | | H04L 67/02 |
| | | | | 455/414.1 |
| 2011/0191687 A1* | 8/2011 | Takeda | | G06F 15/177 |
| | | | | 715/736 |
| 2011/0276720 A1 | 11/2011 | Ickman et al. | | |
| 2012/0023390 A1* | 1/2012 | Howes | | G06F 16/986 |
| | | | | 715/205 |
| 2012/0084632 A1* | 4/2012 | Lim | | G06F 16/9562 |
| | | | | 715/206 |
| 2012/0301111 A1* | 11/2012 | Cordova | | H04N 21/47205 |
| | | | | 386/245 |
| 2012/0323883 A1* | 12/2012 | Figg | | G06Q 30/0275 |
| | | | | 707/E17.108 |
| 2013/0311497 A1* | 11/2013 | Jang | | G06F 16/9562 |
| | | | | 707/758 |
| 2013/0311906 A1* | 11/2013 | Mackin | | H04L 51/32 |
| | | | | 715/758 |
| 2014/0090055 A1* | 3/2014 | Palumbo | | H04L 63/145 |
| | | | | 726/22 |
| 2014/0280883 A1* | 9/2014 | Pieczul | | H04L 67/02 |
| | | | | 709/224 |
| 2014/0324943 A1* | 10/2014 | Antipa | | G06F 40/166 |
| | | | | 709/203 |
| 2015/0026260 A1* | 1/2015 | Worthley | | G06F 16/958 |
| | | | | 709/204 |
| 2016/0014122 A1* | 1/2016 | Pieczul | | H04L 63/0876 |
| | | | | 726/4 |
| 2016/0259496 A1* | 9/2016 | Butcher | | G06F 3/04842 |
| 2016/0259517 A1* | 9/2016 | Butcher | | G06F 3/0488 |
| 2017/0060355 A1* | 3/2017 | Padmanabhan | | G06F 3/0486 |
| 2017/0324800 A1* | 11/2017 | DeLuca | | G06Q 30/0631 |
| 2018/0039385 A1* | 2/2018 | Worley | | G06F 9/543 |
| 2018/0255134 A1* | 9/2018 | Goli | | H04L 67/1095 |
| 2018/0332076 A1* | 11/2018 | Callahan | | G06F 21/566 |
| 2019/0286851 A1* | 9/2019 | Fang | | G06F 16/44 |
| 2020/0104327 A1* | 4/2020 | Heer, III | | G06F 16/907 |
| 2021/0021612 A1* | 1/2021 | Higbee | | H04L 51/12 |

OTHER PUBLICATIONS

Kyrnin, Jennifer, "How to Use the Meta Refresh Tag", Retrieved from: https://www.thoughtco.com/meta-refresh-tag-3469046, Mar. 11, 2020, 10 Pages.

"International Search Report and Written opinion Issued in PCT Application No. PCT/US21/064470", dated Apr. 22, 2022, 17 Pages.

* cited by examiner

SYSTEMS AND METHODS FOR STORING REFERENCES TO ORIGINAL UNIFORM RESOURCE IDENTIFIERS

BACKGROUND

A web browser (or "browser") is a software application for accessing information on the World Wide Web. A web browser is installed on user devices to enable users of those devices to retrieve resources (e.g., individual web pages, images, videos, etc.) from a web server and display them on the user devices for interaction. To retrieve a particular resource, a user may provide or specify a uniform resource identifier (such as a uniform resource locator (or URL)) to the web browser. The web browser accesses the resource located at the URL and renders it for display. In some situations, the resource is not actually located at the URL, but instead is located on another domain or web server. In such instances, the original web server may provide a response to the web browser that indicates that the resource is located at a different URL (also referred to as a redirect URL). Responsive to receiving such a response, the web browser redirects to that different URL to retrieve the resource. After traversing to the redirect URL, a user may desire to bookmark (or "favorite") the web page located at the redirect URL. However, a bookmark to a redirect URL may introduce various issues.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein enable a web browser to generate and store a reference, such as a bookmark, to the original universal resource identifier (URI) specified by a user, after the web browser has been redirected to a redirect URI. For example, the web browser may track each of the URIs to which the web browser has redirected after the user provides a URI to the web browser for navigation thereto. The web browser may analyze each of the URIs (including the URI originally provided by the user) to determine which of the URIs is the original URI. When a user causes the web browser to generate the bookmark for the web page corresponding to the redirect URI, the determined original URI and/or redirect URI may be associated with the bookmark. For example, the user may be provided an option to select one or both of the determined original URI and the redirect URI to be associated with the bookmark.

The embodiments described encompass other types of references, including, but not limited to, shortcuts, pinned shortcuts, etc. The embodiments described herein also encompass a browser history, which may be organized to group, for a particular web page, the original URI and any associated redirect URI. The embodiments described herein also encompass copy and paste operations. In accordance with such an embodiment, when a user copies a redirect URI displayed in an address bar, the determined original URI and/or the redirect URI is/are copied to a clipboard buffer. When a user requests to paste the contents from the clipboard buffer, the determined original URI and/or the redirect URI may be presented to the user or provided to the pasting application as different paste options.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
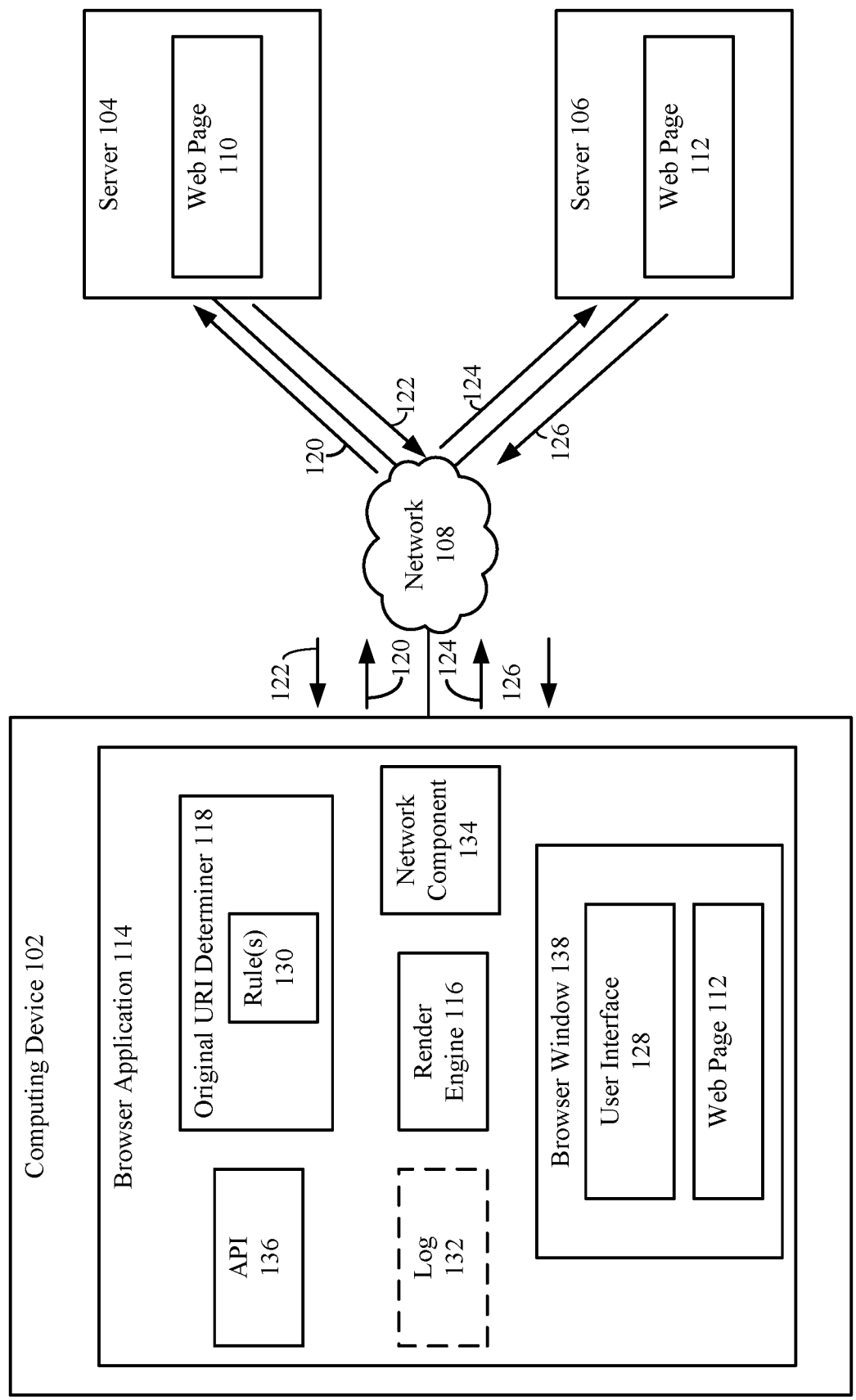
FIG. 1 shows a block diagram of a system for determining an original uniform resource identifier (URI) and storing a reference therefor in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments.

The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As described above, certain universal resource identifiers (URIs) (e.g., URLs), when provided to a web browser, immediately redirect the user to another URI (i.e. a redirect URI). This occurs for various reasons, such as for authentication purposes, to load device-specific pages, or because the original URI was a shortened URI provided by a URI shortening service. Once at the web page to which the web browser is redirected, a user may bookmark the web page. However, bookmarks to redirect URIs may be inaccurate and cause issues when subsequently loading that web page using the bookmark.

For instance, if a web browser was redirected to a target URI from a shortened URI, and the original URI is updated to redirect to new content, the bookmark will continue to point to the old, potentially-invalid URI. In another example, if the original URI specified by the user was a client device-agnostic landing page that redirects to a client device-specific page (e.g., a page optimized for viewing on a certain type of device, such as a smart phone), the user's bookmark of the client device-specific page cannot be shared to different device types without causing unexpected loading of an incorrect page. In yet another example, if the original URI was a pre-authorization page and the redirected URI included an authN or authZ token in the URI, the bookmark would contain that token, which would soon expire and cause the loading of the bookmarked URI to fail.

The embodiments described herein enable a user to generate and store a reference, such as a bookmark, to the original URI specified by the user, after the web browser has been redirected to a redirect URI. For example, the web browser may track each of the URIs to which the web browser has redirected after the user provides a URI to the web browser for navigation thereby. The web browser may analyze each of the URIs (including the URI originally provided by the user) to determine which of the URIs is the original URI. When a user causes the web browser to generate the bookmark for the web page corresponding to the redirect URI, the determined original URI and/or redirect URI may be associated with the bookmark. For example, the user may be provided an option to select one or both of the determined original URI and the redirect URI to be associated with the bookmark. In another example, a default or explicit setting may select to store the original URI in preference to the redirect URI with the bookmark.

The embodiments described herein may be extended to other types of references, including, but not limited to, shortcuts, pinned shortcuts, etc. The embodiments described herein may also be extended to a browser history, which may be organized to group historically visited URIs based on a corresponding original URI. The embodiments described herein may further be extended to copy and paste operations. In accordance with such embodiments, when a user copies a redirect URI displayed in a web browser address bar, the determined original URI and/or the redirect URI may be copied to a clipboard buffer. When a user requests to paste the contents from the clipboard buffer, the determined original URI and/or the redirect URI may be presented to the user as different paste options. Similarly, when an application requests contents from a clipboard buffer, the original URI and/or the redirect URI may be available to that application.

It is noted that while embodiments described herein are with reference to URIs, the embodiments described herein are applicable to various types of URIs, including, but not limited to URLs, uniform resource names (URNs), etc.

FIG. 1 shows a block diagram of a system 100 for determining an original URI and storing a reference therefor in accordance with an example embodiment. As shown in FIG. 1, system 100 includes a computing device 102, a first server 104, and a second server 106, which are communicatively coupled via a network 108. Network 108 may comprise one or more networks such as local area networks (LANs), wide area networks (WANs), enterprise networks, the Internet, etc., and may include one or more of wired and/or wireless portions. Computing device 102 is a computing device via which a user is enabled to run applications and visit web pages compatible with various web browsers. Computing device 102 may be any type of mobile computing device, such as a Microsoft® Surface® device, a personal digital assistant (PDA), a laptop computer, a notebook computer, a tablet computer such as an Apple iPad™, a netbook, a smart phone (such as an Apple iPhone, a phone implementing the Google® Android™ operating system, etc.), a wearable computing device (e.g., a head-mounted device including smart glasses such as Google® Glass™, a virtual headset such as Oculus Rift® by Oculus VR, LLC or HoloLens® by Microsoft Corporation, etc.), a stationary computing device such as a desktop computer or PC (personal computer), or other browser-enabled device. Each of servers 104 and 106 may be computing devices that are configured as web servers configured to host web pages. For instance, as shown in FIG. 1, server 104 hosts a web page 110, and server 106 hosts a web page 112.

As shown in FIG. 1, computing device 102 comprises a browser application 114. Browser application 114 is a web browser, which is a software application configured for accessing information on the World Wide Web. For instance, browser application 114 may be configured to receive links to web pages (e.g., web pages 110 and 112), to retrieve the web pages at uniform resource identifiers (e.g., network addresses, uniform resource locators (URLs), etc.) indicated by the links or that are user-specified, and to render pages for display to a user of computing device 102. Examples of browser application 114 include, but are not limited to, Internet Explorer® or Microsoft Edge®, both developed by Microsoft Corp. of Redmond, Wash., Mozilla Firefox®, developed by Mozilla Corp. of Mountain View, Calif., Safari®, developed by Apple Inc. of Cupertino, Calif., and Google® Chrome™ developed by Google Inc. of Mountain View, Calif.

As also shown in FIG. 1, browser application 114 comprises a render engine 116, a network component 134, an application programming interface (API) 136, and an original uniform resource identifier (URI) determiner 118. Render engine 116 is configured to generate a display of content in browser windows (e.g., browser window 138) and/or browser tabs of browser windows, including transforming HTML (hypertext markup language) documents and other resources of a web page into an interactive visual representation. In an embodiment, render engine 116 may be configured to perform page layout and rendering of content within a display window region of a corresponding browser window and/or tab. Examples of browser engines include Gecko™ used in the Mozilla Firefox® web browser, the WebKit™ engine used by the Apple Safari browser, Trident™ (MSHTML) used in Internet Explorer™, and Blink™ used in the Google Chrome and Microsoft Edge Browsers.

API 136 comprises an interface that enables browser application 114 to communicate with other applications executing on computing device 102 and/or an operating system executing on computing device 102.

Network component 134 is configured to implement a request-response protocol in which request messages for particular web pages are transmitted thereby and messages responsive to the request messages are received. In accordance with an embodiment, network component 134 is configured to transmit hypertext transfer protocol (HTTP) requests and receive HTTP responses. For example, to navigate to a particular web page (e.g., web page 110), a user may specify a URI or interact with a hyperlink corresponding to a URI. The URI corresponds to a server (e.g., first server 104) that hosts the web page. Upon receiving the URI, network component 134 may establish a transmission control protocol (TCP) connection with server 104. Once the TCP connection is established, network component 134 may send an HTTP request 120 (e.g., an HTTP GET request) to server 104, via network 108, to retrieve the desired web page (e.g., web page 110). Server 104 may send an HTTP response 122, via network 108, to network component 134 indicating that request 120 was successfully received and/or comprising components of web page 110 (e.g., the hypertext markup language (HTML), Cascaded Style Sheets (CSS), JavaScript, etc.). Responsive to receiving response 122, render engine 116 parses and/or executes the components (e.g., parses the HTML and/or CSS Sheets, and/or executes JavaScript of web page 110) and renders web page 110 in browser window 138 of browser application 114 accordingly.

In certain scenarios, response 122 may be a redirect message (e.g., a HTTP response having a status code in the range 300-399). The redirect message may further specify a URI to which browser application 114 is to be redirected. Such a URI may be referred to as a redirect URI. For instance, the redirect message may specify a URI corresponding to server 106. Responsive to receiving such a message, network component 134 may establish a transmission control protocol (TCP) connection with server 106. Once the TCP connection is established, network component 134 may send an HTTP request 124 to server 106, via network 108, to retrieve web page 112. Server 106 may send an HTTP response 126, via network 108, to network component 134 indicating that request 124 was successfully received and/or comprising components of web page 112. Responsive to receiving request 122, render engine 116 parses and/or executes the components and renders web page 112 in browser window 138 of browser application 114 accordingly. It is noted that in certain instances, HTTP response 126 may be another redirect message that causes browser application 114 to redirect to another server (not shown). Browser application 114 may be redirected to any number of URIs.

In certain scenarios, browser application 114 may be redirected to another URI based on a refresh tag included in a header of the web page 110. Such a technique is also referred to as a meta refresh. In accordance with a meta refresh, the header of a web page (e.g., web page 110) may comprise a refresh tag that specifies a content attribute value and a different URI to which browser application 114 is to be redirected. The content attribute value may specify a refresh time interval. Upon loading web page 110, a timer is initiated. When the refresh time interval is reached, network component 134 is instructed to navigate to the different URI, e.g., by transmitting request 124. In such scenarios, the refresh time interval may be set to a relatively low value (e.g., a value of zero, or a value less than or equal to 1 or 5 seconds, etc.).

Browser application 114 may optionally maintain a log 132 of each of the URIs to which browser application 114 was redirected with respect to a particular URI specified by the user. In embodiments, each URI stored in log 132 may be associated with the response status code and/or the URI to which browser application 114 was redirected (i.e., the redirect URI) from that URI. In embodiments, each URI stored in log 132 may be associated with a result of an original URI determiner 118, or be limited to potential original URIs, or may be a single original URI for the presently displayed page. Accordingly, log 132 may comprise a chain of redirect URIs, starting with the original URI initially specified by the user, and ending at the final redirect URI.

Browser window 110 comprises a user interface 128. User interface 128 is a graphical user interface (GUI) that comprises a plurality of user interface elements. Examples of such user interface elements include, but are not limited to, an address bar for specifying a URI to which browser application 114 is to navigate and to display the URI of the current web page being displayed by browser application 114, a back button and a forward button, which enable a user to navigate to different URIs stored in a browser history maintained by browser application 114 in a backward and forward manner, respectively, a refresh button, which reloads or ("refreshes") the web page displayed in browser window 138 of browser application 114, one or more user interface elements that enable a user to generate a reference to a web page displayed in browser window 138 of browser application 114, etc. Examples of references include, but are not limited to a bookmark for a web page, a shortcut to the web page, a web site that is pinned to a taskbar of an operating system executing on computing device 102, etc.

When generating a reference to a web page, conventional techniques enable the user to generate a reference (e.g., a bookmark) to only the final target URI to which the browser application 114 was redirected and currently displaying (i.e., the URI displayed in the browser's address bar). In certain instances, a user may instead prefer to generate a reference for the original URI provided to browser application 114 by the user (e.g., via a user-specified URI entered in the address bar of user interface 128, via clicking on a hyperlink that is detected by browser application 114, etc.). For instance, the original URI may be a shortened URI (e.g., provided by a URI shortening service, such as, but not limited to Bitly®, published by Bitly, Inc. of New York City, N.Y.), which points to a target URI. If the user bookmarks the target URI, and the target URI is updated to point to new content, the user's bookmark will continue to point to the old target URI (and potentially-invalid content). In another example, if the original URI was a client device-agnostic landing page that redirects to a client device-specific page (e.g., a page optimized for viewing on a certain type of device, such as a smart phone), the user's bookmark of the client device-specific page cannot be shared to different device types without causing unexpected loading of an incorrect page. In yet another example, if the original URI was a pre-authorization page and the redirected URI included an authN or authZ token in the URI, the bookmark would contain that token, which would soon expire and cause the loading of the bookmarked URI to fail.

Original URI determiner 118 is configured to determine an original URI. Original URI determiner 118 may be configured to determine an original URI responsive to browser application 114 receiving a URI based on a user's action (e.g., by providing a URI via the address bar of user interface 128, responsive to clicking on a hyperlink, etc.) and/or at the time at which a user interacts with a user interface element of user interface 128 that causes a reference to a URI to be generated.

For example, when receiving a URI based on a user's action, the received URI may be stored as an initial original URI before browser application 114 is redirected to another URI. For instance, when a user provides a URI by entering the URI in an address bar, the URI may be stored as the original URI by browser application 114 responsive to the user pressing the Enter key (or responsive to any other user action that cause browser application 114 to navigate to the URI entered in to the address bar). In another example, when a user clicks on a hyperlink (e.g., displayed in a web page presented by browser application 114, presented as a bookmark by browser application 114, presented as an entry included in a browser history of browser application 114, displayed via another application, such as an email application, displayed as a desktop shortcut of an operating system, displayed a shortcut pinned to a taskbar of the operating system, etc.), browser application 114 is instructed to navigate to the URI corresponding to the hyperlink. Responsive to determining the URI associated with the hyperlink, original URI determiner 118 may store that URI as the initial original URI. For example, original URI determiner 118 may designate this URI as being an original URI in log 132. In a further example, a user-initiated script executing on the web page may cause browser application 114 to navigate to another web page. For instance, the script may be initiated by a user interacting with a user interface element displayed via the web page (e.g., hovering over the user interface element for a predetermined time period, selecting the user interface element, etc.). Original URI determiner 118 is configured to detect execution of the script and/or determine that the script has caused browser application 114 to navigate to a different URI. Original URI determiner 118 stores such an URI as the initial original URI. For example, original URI determiner 118 may designate this URI as being an original URI in log 132. When the user interacts with a user interface element to store a reference to the web page associated with the redirected URI, the original URI may then be associated with that web page, rather than the redirected URI.

However, there may be instances in which the original URI is not to be associated with that web page and that a different URI should be designated as the original URI. Original URI determiner 118 may apply one or more rules 130 to determine whether or not a particular URI should be designated as the original URI.

For instance, when a user interacts with a user interface element of user interface 128 that causes a reference to a URI to be generated, original URI determiner 118 may apply a first rule that is configured to compare the initially-set original URI to an ignore-list of URIs (or partial URIs). In one example, the first rule may comprise one or more regular expressions configured to determine whether the original URI matches a predetermined URI pattern on the ignore-list. In another example, the ignore-list may comprise a listing of URIs that have been designated as not being original URIs. In such an example, original URI determiner 118 compares the URI to each of the URIs in the listing and determines whether the URI matches one of the URIs in the listing. In another example, the ignore-list may match based on metadata tags (described in more detail below). In each example, if a match is determined, then the URI is determined to not be an original URI. Original URI determiner 118 may designate such URIs as not being original URIs in log 132. Original URI determiner 118 may then apply the same rule to the next URI that browser application 114 is redirected to, until either a URI is determined not to match the ignore-list. If applied after the browser has been redirected, the URI determiner 118 may apply the rules backwards through a history of URIs (e.g., a history of redirect URIs; for example, as specified in log 132), until a most-recent history URI is found not to match the ignore-list. The determined URI is designated as being the original URI (e.g., in log 132).

One example of a type of URI that may be included on a ignore-list includes a URI for a single-sign-on (SSO) web page (to which browser application 114 is redirected and then automatically redirected to the desired web site upon successful authentication). Another example is a URI that wraps another URI. For example, certain email servers or websites may automatically wrap a particular URI around another URI (i.e., the URI that was intended to be sent from one user to another user via email). This may be done for security purposes. For instance, an email server may implement a web service that scans incoming e-mail messages for known malicious hyperlinks and for attachments containing malware. The web service may re-format the hyperlink to wrap a URI associated with the service around the hyperlink. Once the hyperlink is re-formatted, the web service analyzes the hyperlink for any potential malicious content. Examples of such web services include but are not limited to URL Defense™ by Proofpoint, Inc. of Sunnyvale, Calif. (which wrap URIs with "https://urldefense.proofpoint.com/), Safe Links™ by Microsoft Corporation, etc. (which may wrap URIs with, as an example, "https://nam01.safelinks.protection.outlook.com."), etc.

In another example, the first rule may comprise one or more regular expressions configured to determine whether the initially-set original URI matches a predetermined URI pattern on an allow-list. In one example, the first rule may comprise one or more regular expressions configured to determine whether the original URI matches a predetermined URI pattern on the allow-list. In another example, the allow-list may comprise a listing of URIs that have been designated as being acceptable original URIs. In accordance with such examples, original URI determiner 118 compares the URI to each of the URIs in the listing and determines whether the URI matches one of the URIs in the listing. In either example, if a match is determined, then the URI is determined to be an original URI. Original URI determiner 118 may designate such a URI as being an original URI in log 132. If a match is not found, original URI determiner 118 may then apply the same rule to the next URI that browser application 114 was redirected to, as specified by log 132. Original URI determiner 118 continues to apply the rule until a URI is found in log 132 that matches a URI on the allow-list. The determined URI is designated as the original URI (e.g., in log 132). One example of a type of URI that may be included on the allow-list includes a URI generated by a URI shortening service.

It is noted that while the examples described above describe original URI determiner 118 as initially applying rule(s) 130 with the initially-set original URI, the embodiments described herein are not so limited. For example, original URI determiner 118 may initially apply rule(s) 130 with the last URI traversed and work backwards until reaching a URI that is accordance with rule(s) 130. Similarly, the ignore-list items described previously and the allow-list items may each be considered a "rule" that may be part of the rule(s) 130.

It is further noted that the application of rule(s) 130 may result in more than one potential original URI to be determined. For instance, the application of a particular rule of rule(s) 130 may result in an indication of the likelihood of a URI being an original URI (or a probability that the URI is an original URI). Original URI determiner 118 may designate the URI having the highest likelihood as being the original URI. In another example, original URI determiner 118 may determine whether the determined likelihood for a particular URI exceeds a predetermined threshold (e.g., 80%). Responsive to determining that the determined likelihood exceeds the predetermined threshold, original URI determiner 118 may designate the URI as being the original URI (e.g., in log 132). In the event that more than one URI has a likelihood that exceeds the predetermined threshold, original URI determiner 118 may designate the URI having the higher likelihood as being the original URI. Alternatively, each of the URIs having a likelihood exceeding the predetermined threshold may be presented to the user, and the user may be enabled to select one of the presented URIs as being the original URI.

Rule(s) 130 may further comprise a second rule that determines whether a response (e.g., response 122 or response 126) comprises a metadata tag that indicates that a corresponding URI is to be excluded from being an original URI. For example, when browser application 114 transmits a request (e.g., request 120 or request 124) to retrieve a web page located at a particular URI, the server receiving the request may send a response comprising a metadata tag that indicates whether the particular URI is to be excluded from being an original URI. The metadata tag may be included in the header of the response. For illustrative purposes, the metadata tag may specify a value that indicates whether a URI is to be excluded (e.g., <META ExcludeAsOriginURI="true"> or may be indicate that an URI is to be excluded by way of its inclusion in the response header (e.g., X-ExcludeAsOrigin").

In accordance with one or more embodiments, rule(s) 130 may be updated (e.g., rules may be added, deleted, and/or modified). For example, in an embodiment in which computing device 102 is part of an enterprise, an administrator may provide an updated group policy comprising updates to rule(s) 130 to computing device 102. In another example, certain web pages may be configured to push updates to rule(s) 130. For example, a web page may redirect browser application 114 to a predetermined URI that provides a file comprising the updated rules. Browser application 114 may analyze or parse the file to determine the rules specified therein and updates rule(s) 130 accordingly.

It is noted original URI determiner 118 may be incorporated into browser application 114 as native functionality, or alternatively, may be incorporated into browser application 114 as a browser extension.

Figure 2:
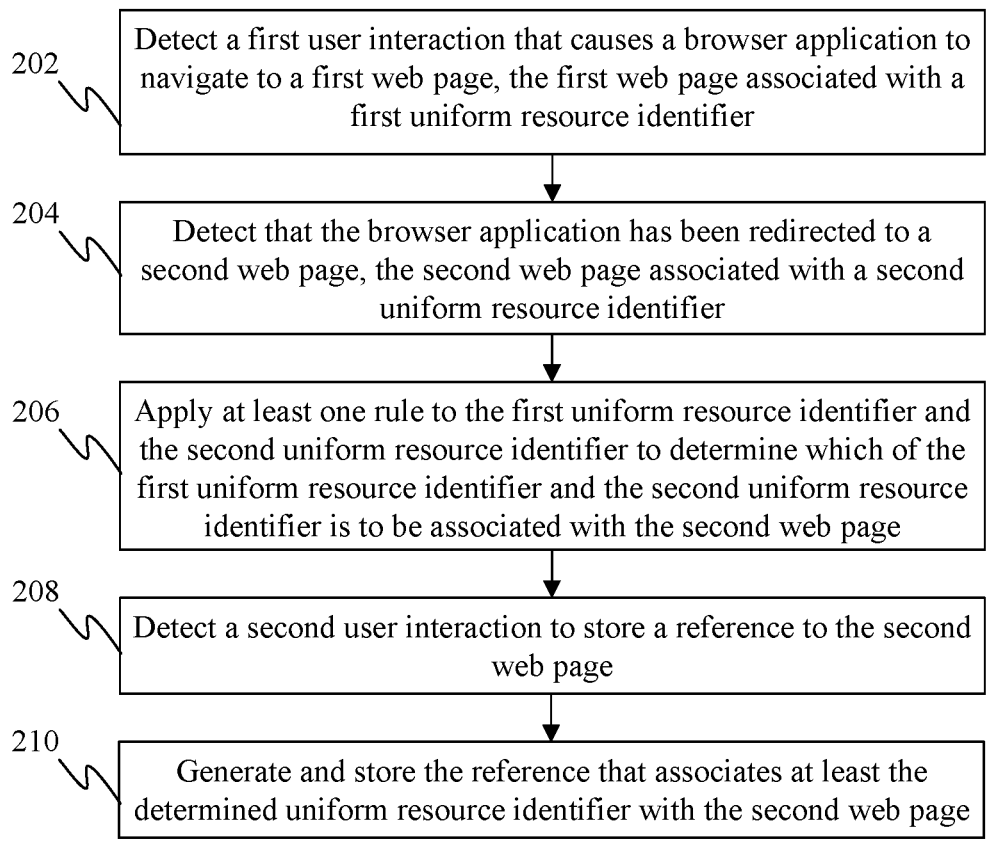
FIG. 2 shows a flowchart of a method in a computing device for determining an original URI and generating a reference that associates the original URI with a particular Web page in accordance with an example embodiment.

Accordingly, an original URI may be determined and stored as a reference in many ways. For example, FIG. 2 shows a flowchart 200 of a method in a computing device for determining an original URI and generating a reference that associates the original URI with a particular Web page in accordance with an example embodiment. In an embodiment, flowchart 200 may be implemented by browser application 114 executing on computing device 102. Accordingly. for purposes of illustration, flowchart 200 is described with continued reference to FIG. 1. Other structural and operational embodiments will be apparent to persons skilled in the relevant art(s) based on the following discussion.

Flowchart 200 of FIG. 2 begins with step 202. In step 202, a first user interaction that causes a browser application to navigate to a first web page is detected. The first web page is associated with a first URI. For instance, with reference to FIG. 1, user interface 128 detects a first user interaction that causes browser application 114 to navigate to first web page 110. First web page 110 is associated with a first URI.

In accordance with one or more embodiment, the first user interaction that causes a browser application to navigate to a first web page comprises one of detecting entry of the first URI into an address bar of the browser application, detecting selection of a hyperlink that causes the browser application to navigate to the first URI, detecting a third user interaction with a user interface element displayed via a third web page, the third user interaction causing the browser application to execute a script, the script causing the browser application to navigate to the first web page, detecting selection of a bookmark maintained by the browser application, the bookmark corresponding to the first URI, or detecting selection of a shortcut associated with the first URI.

For example, with reference to FIG. 1, user interface 128 may detect entry of the first URI into an address bar of browser application 114. User interface 128 may also detect a user selection (e.g., via a mouse click, a touch-based input received via a touch screen etc.) of a bookmark maintained by browser application 114 that, when selected, causes browser application 114 to navigate to the first URI corresponding to first web page 110. User interface 128 may also detect a user interaction with a user interface element (e.g., a button) displayed on a web page. The user interaction may comprise hovering over the user interface element for a predetermined period of time, selecting the user interface element, etc. User interaction with the user interface element may cause a script to execute on a web page, which causes browser application 114 to navigate to first web page 110. User interface 128 may also detect selection (e.g., via a mouse click, touch-based input received via a touch screen, etc.) of a hyperlink that causes browser application 114 to navigate to the first URI associated with first web page 110. For instance, the hyperlink may be displayed in web page rendered in browser window 138.

Alternatively, the hyperlink may be displayed in an application different than browser application 114. Examples of such an application may be a word processing application (e.g., Microsoft Word® published by Microsoft® Corporation), an e-mail application (e.g., Microsoft Outlook® published by Microsoft® Corporation), a presentation application (e.g., Microsoft PowerPoint® published by Microsoft® Corporation), or any other application that is configured to present hyperlinks. Upon a user selecting the hyperlink in such an application, the application may send a request to API 136 of browser application 114 specifying the URI associated with the hyperlink. Responsive to receiving the request, network component 134 sends a request (e.g., request 120 or 124) for the web page associated with the URI. In such an example, browser application 114 detects selection of the hyperlink responsive to receiving the request via API 136.

In another example, browser application 114 may detect selection of a shortcut associated with the first URI. For instance, an operating system (not shown) executing on computing device 102 may display a shortcut to the first URI, e.g., on the desktop of the operating system. Upon a user selecting the shortcut, the operating system may send a request to API 136 of browser application 114 specifying the URI associated with the shortcut. Responsive to receiving the request, network component 134 sends a request (e.g., request 120 or 124) for the web page associated with the URI of the shortcut. In such an example, browser application 114 detects selection of the shortcut responsive to receive the request via API 136.

In step 204, the browser application is detected to have been redirected to a second web page. The second web page is associated with a second URI. For instance, with reference to FIG. 1, network component 134 detects that browser application 114 has been redirected to second web page 112. Second web page 112 is associated with a second URI. Techniques for detecting a redirection are described below with reference to FIG. 4.

In step 206, a determination is made as to which of the first URI and the second URI is to be associated with the second web page 112 (i.e., determine which of the first URI and the second URI is the origin URI). In at least some embodiments, at least one rule is applied to the first URI and the second URI to determine which of the first URI and the second URI is to be associated with the second web page. For instance, with reference to FIG. 1, original URI determiner 118 applies at least one rule of rule(s) 130 to determine which of the first URI and the second URI is to be associated with second web page 112.

In accordance with one or more embodiments, the at least one rule comprises an exclude-response-rule that determines whether a first response message received in response to navigating to the first web page comprises a first metadata tag that indicates that the first uniform resource identifier is to be excluded from association with the second web page, and determines whether a second response message received in response to navigating to the second web page comprises a second metadata tag that indicates that the second uniform resource identifier is to be excluded from association with the second web page. For instance, with reference to FIG. 1, rule(s) 130 may comprise a first rule that original URI determiner 118 applies to determine whether response 122 comprises a first metadata tag (e.g., <META ExcludeAsOriginURI="true">, X-ExcludeAsOrigin, and/or the like) that indicates that the first URI associated with web page 110 is to be excluded from association with the second web page 112, and to determine whether response message 126 comprises a second metadata tag that indicates that the second URI associated with second web page 112 is to be excluded from association with second web page 112. If response 122 comprises such a metadata tag, then original URI determiner 118 excludes first URI from being associated with second web page 112 (i.e., the first URI is excluded from being a possible original URI). Similarly, if response 126 comprises such a metadata, then original URI determiner 118 excludes second URI from being associated with second web page 112 (i.e., the second URI is excluded from being a possible original URI).

In accordance with one or more embodiments, the at least one rule comprises an ignore-rule. For example, the ignore-rule may be used to determine whether the first URI and the second URI match a predetermined pattern or match a particular URI included in a predetermined list of URIs, exclude the first URI from being associated with the second web page responsive to determining that the first URI matches the predetermined pattern or matches the particular URI, and exclude the second URI from being associated with the second web page responsive to determining that the second URI matches the predetermined pattern or matches the particular URI. For example, with reference to FIG. 1, original URI determiner 118 applies a second rule of rule(s) 130 to determine whether the first URI and the second URI match a predetermined pattern or match a particular URI included in a predetermined list of URIs. Responsive to determining that the first URI matches the predetermined pattern or matches the particular URI, original URI determiner 118 excludes the first URI from being associated with second web page 112 (e.g., the first URI is excluded from being a possible original URI). Similarly, responsive to determining that the second URI matches the predetermined pattern or matches the particular URI, original URI determiner 118 excludes the second URI from being associated with second web page 112 (i.e., the second URI is excluded from being a possible original URI).

In step 208, a second user interaction is detected to store a reference to the second web page. For instance, with reference to FIG. 1, user interface 128 detects a second user interaction to store a reference to second web page 112. Additional details regarding user interactions for storing references to a web page are described below in Subsections A-C.

In step 210, responsive to detecting the second user interaction to store the reference to the second web page, the reference that associates at least the determined URI with the second web page is generated and stored. For instance, with reference to FIG. 1, responsive to detecting the second user interaction to store the reference to the second web page, browser application 114 may generate and store the reference that associates at least the determined URI second web page 112.

Figure 3:
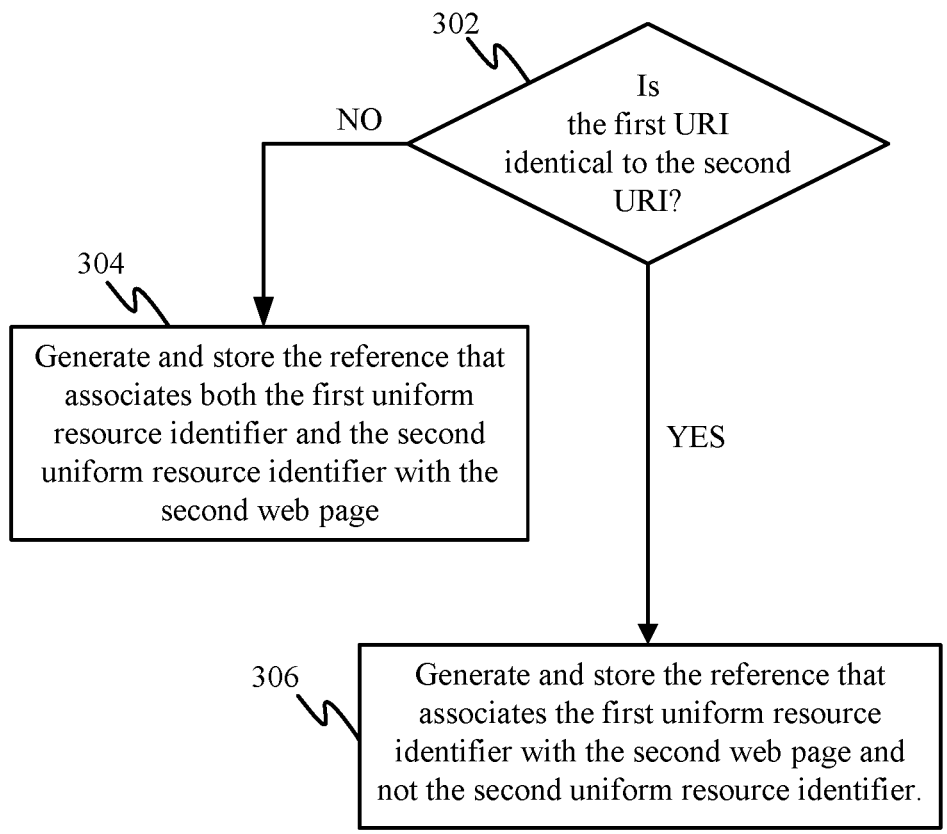
FIG. 3 shows a flowchart of a method for associating multiple URIs with a web page in accordance with an example embodiment.

In accordance with one or more embodiments, both the first URI and the second URI may be associated with the second web page. For example, FIG. 3 shows a flowchart 300 of a method for associating multiple URIs with a web page in accordance with an example embodiment. In an embodiment, flowchart 300 may be implemented by browser application 114 executing on computing device 102. Accordingly, for purposes of illustration, flowchart 300 is described with continued reference to FIG. 1. Other structural and operational embodiments will be apparent to persons skilled in the relevant art(s) based on the following discussion.

Flowchart 300 of FIG. 3 begins with step 302. In step 302, a determination is made as to whether the first URI and the second URI are identical. For example, with reference to FIG. 1, original URI determiner 118 may determine whether the first URI and the second URI are identical. If a determination is made that the first URI and the second URI are not identical, flow continues to step 304. Otherwise, flow continues to step 306.

At step 304, the reference is generated and stored that associates both the first URI and the second URI with the second web page. For example, with reference to FIG. 1, original URI determiner 118 generates and stores the reference that associates both the first URI and the second URI with second web page 112.

At step 306, the reference is generated and stored that associates the first URI with the second web page and not the second URI. For example, with reference to FIG. 1, original URI determiner 118 generates and stores the reference that associates the first URI with second web page 112, and does not associate the second URI with second web page 112. Additional details regarding the types of references to a web page that may be stored are described below in Subsections A-C.

Figure 4:
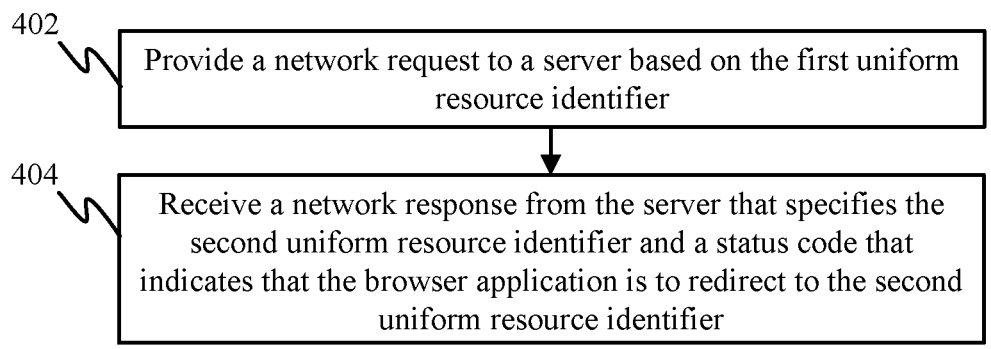
FIG. 4 shows a flowchart of a method for detecting that a browser application has been redirected in accordance with an example embodiment.

FIG. 4 shows a flowchart 400 of a method for detecting that a browser application has been redirected in accordance with an example embodiment. In an embodiment, flowchart 300 may be implemented by browser application 114 executing on computing device 102. Accordingly, for purposes of illustration, flowchart 400 is described with continued reference to FIG. 1. Other structural and operational embodiments will be apparent to persons skilled in the relevant art(s) based on the following discussion.

Flowchart 400 of FIG. 4 begins with step 402. In step 402, a network request is provided to a server based on the first URI. For instance, with reference to FIG. 1, network component 134 provides request 120 to server 104 based on the first URI.

At step 404, a network response from the server is received. The network response specifies the second URI and a status code that indicates that the browser application is to redirect to the second URI. For example, with reference to FIG. 1, response 122 may specify the second URI and a status code (e.g., a status code staring with "3") that indicates that browser application 114 is to redirect to the second URI. In response to detecting response 122, network component 134 transmits request 124 to server 106 for second web page 112. Responsive to detecting the status code in response 122, browser application 114 detects that browser application 114 has been redirected to second web page 112.

In accordance with one or more embodiments, detecting that the browser application has been redirected to the second web page comprises detecting a refresh tag in a header of the first web page, the refresh tag being associated with a content attribute value that has a predetermined relationship with a predetermined value and associated with the second uniform resource identifier. For example, with reference to FIG. 1, render engine 116 may detect a refresh tag in a header of first web page 110. The refresh tag may be associated with a content attribute value that has a predetermined relationship with a predetermined value and associated with the second URI of second web page 112. For instance, render engine 116 may determine whether the content attribute value set for the refresh tag is a relatively lower value (e.g., less than or equal to 5 seconds) and whether the refresh tag is associated with another URI (e.g., the second URI). The content attribute value represents a refresh time interval. Upon loading web page 110, browser application 114 initiates a timer. When the refresh time interval is reached, network component 134 is instructed to navigate to the URI associated with the refresh tag, e.g., by transmitting request 124. Browser application 114 may detect that a redirection has occurred to second web page 112 responsive to sending request 124.

A. Techniques for Storing a Reference as a Bookmark

Figure 5:
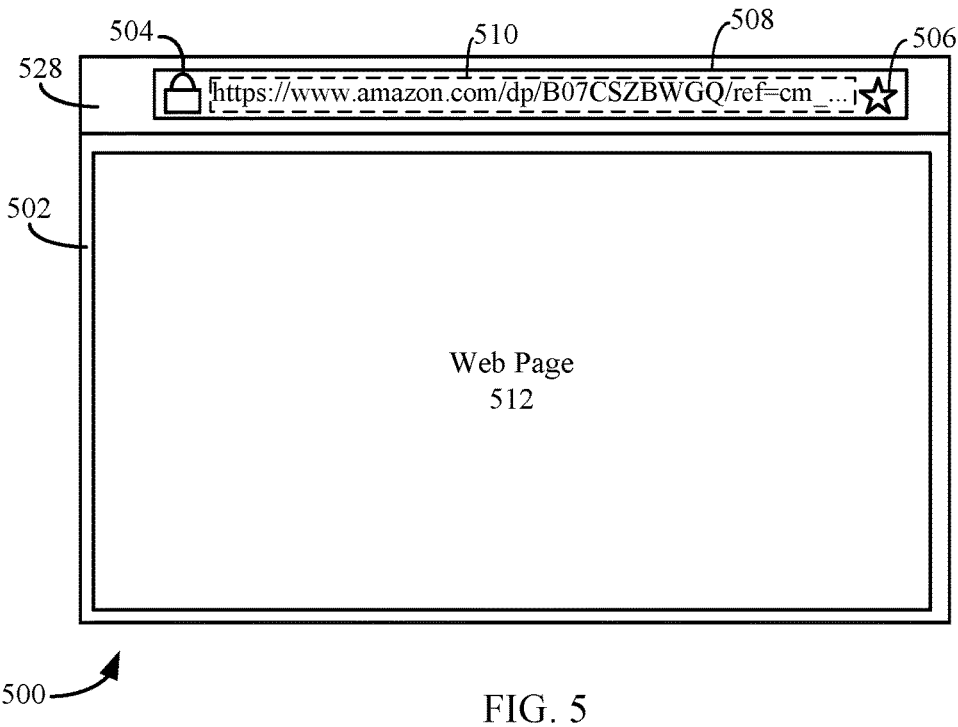
FIG. 5 depicts an example browser window in accordance with an example embodiment.

In accordance with an embodiment, the reference generated and stored is a bookmark, which associates the determined original URI with the web page for which the bookmark is to be generated. For example, FIG. 5 depicts an example browser window 500 in accordance with an example embodiment. Browser window 500 is an example of browser window 138, as described above with reference to FIG. 1.

As shown in FIG. 5, browser window 500 comprises a user interface 528 and a display region 502 in which a web page 512 is rendered. User interface 528 is an example of user interface 128, and web page 512 is an example of web page 112, as respectively described above with reference to FIG. 1. User interface 528 comprises a plurality of user interface elements, including, but not limited to an address bar 508, a site information user interface element 504, and a bookmark user interface element 506. User interface 528 may comprise additional user interface elements (e.g., a back button, a forward button, a refresh button) that are not shown for the sake of brevity. Site information user interface element 504 may indicate whether the web page displayed in display region 502 of browser window 500 (i.e., web page 512) is secure. Address bar 508 enables a user to enter a URI to which the browser application (e.g., browser application 114) is to navigate and also displays the URI of the web page displayed in display region 502 of browser window 500. Bookmark user interface element 506, when interacted by the user, causes a bookmark to be generated and stored for the web page displayed in display region 502 of browser window 500.

As shown in FIG. 5, address bar 508 displays a URI 510 of web page 512 (i.e., https://www.amazon.com/dp/B07CSZBWGQ/ref=cm_sw_su_dp). However, suppose this is not the URI that was specified by the user. Instead, the user specified a shortened URI (e.g., https://amzn.to/B07CSZBWGQ via address bar 508. Upon specifying the shortened URI, the browser application was redirected to URI 510 in accordance with the embodiments described above with reference to FIG. 1.

To bookmark web page 512, a user may select bookmark user interface element 506. Responsive to selecting bookmark user interface element 506, original URI determiner 118 may apply rule(s) 130 to determine the original URI specified by the user. In the example described above, the original URI is determined to be https://amzn.to/B07CSZBWGQ.

It is noted that original URI determiner 118 may determine the original URI prior to the user selecting bookmark user interface element 506. For example, original URI determiner 118 may determine the original URI responsive to the user entering https://amzn.to/B07CSZBWGQ into address bar 508 or otherwise navigating to that URI.

Figure 6A:
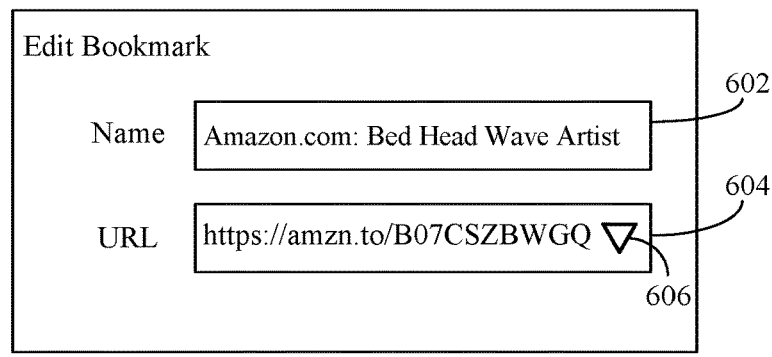
FIGS. 6A and 6B depicts user interface windows for configuring a bookmark in accordance with example embodiments.
Figure 6B:
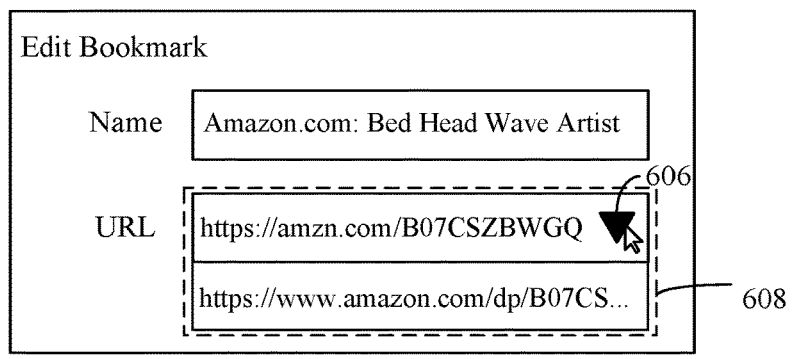

Responsive to selecting bookmark user interface element 506, user interface 528 may display a user interface window enabling the user to configure the bookmark. For example, FIGS. 6A and 6B depicts user interface windows 600A and 600B for configuring a bookmark in accordance with example embodiments. As shown in FIG. 6A, user interface window 600A comprises a first text box 602 and a second text box 604. First text box 602 comprises a name or title for web page 512. User interface 528 may default to populating first text box 602 with the name or title of web page 512 that is specified in the HTML of web page 512. However, a user may select the text displayed in first text box 602 to modify or change the name or title. Second text box 604 comprises the original URI for web page 512 that is determined by original URI determiner 118. As shown in FIG. 6A, original URI determiner 118 has determined the original URI to be the shortened URI (i.e., https://amzn.to/B07CSZBWGQ) that was input into address bar 508 by the user, and therefore, the shortened URI is displayed via second text box 604. Accordingly, even though URI 510 (i.e., https://www.amazon.com/dp/B07CSZBWGQ/ref=cm_sw_su_dp) is displayed in address bar 508 at the time the user utilizes bookmark user interface element 506, the bookmark generated for web page 512 is associated with the original, shortened URI previously-inputted by the user via address bar 508.

As further shown in FIG. 6A, second text box 604 may be associated with a user interface element 606 that enables the user to change the URI to be associated with the bookmark. User interface element 606 may be a pull-down menu option, which when selected, presents a plurality of different URIs that may be associated with the bookmark.

For example, as shown in FIG. 6B, a user has selected user interface element 606, which causes a pull-down menu 608 to be displayed. Pull-down menu 608 displays a plurality of different URIs that may be associated with the bookmark being generated. In the example shown in FIG. 6B, pull-down menu 608 displays both the original URI determined by original URI determiner 118 and the actual, redirected URI of web page 512. It is noted that if original URI determiner 118 determines that the original URI and the final, redirect URI are identical, user interface 628 only displays one URI corresponding to the identical URI, as described above with reference to FIG. 3.

It is further noted that pull-down menu 608 may display additional URIs. For example, in a scenario in which browser application 114 is redirected multiple times before reaching web page 512, each of the redirected URIs (e.g., that are in compliance with rule(s) 130) may be presented as an option for selection via pull-down menu 608.

User interface 528 may default to populating second text box 604 with the original URI determined by original URI determiner 118. Although, the embodiments described herein are not so limited. For example, user interface 528 may default to populating second text box 604 with the final, redirect URI (i.e., https://www.amazon.com/dp/B07CSZBWGQ/ref=cm_sw_su_dp). In embodiments, displayed URI options may be ordered based on a probability that the URI is the original URI. In embodiments, URIs fully excluded by one or more rules may be displayed for selection after other URIs.

It is noted that that user interface windows 600A and 600B, text boxes 602 and 604, and user interface element 606 described above are purely exemplary and shown for illustrative purposes and that user interface 528 may present different options for generating and configuring bookmarks in accordance with the embodiments described above in any suitable manner.

A user may be enabled to generate additional types of references using user interface 528. For instance, a user may cause a shortcut to web page 512 to be generated by selecting (e.g., dragging and dropping) site information user interface element 504 to the desktop displayed via the operating system executing on the user's computing device. A user may also cause a shortcut to web page 512 to be pinned to a taskbar of the operating system using one or more menu options (not shown) presented via user interface 528.

The shortcut and/or pinned shortcut may default to associating the original URI with web page 512. However, in certain embodiments, the original URI, the final redirect URI, and/or any other URIs to which the browser application was redirected before reaching the final URI may be associated with the shortcut and/or pinned shortcut. In accordance with such embodiments, a user may interact with the shortcut and/or pinned shortcut to select which URI is to be opened via the shortcut and/or pinned shortcut. For instance, in one example embodiment, a user may provide input (e.g., a right click on the shortcut and/or pinned shortcut, touch-based input (a tap input, a "touch-and-hold" input, touch input that exceeds a pressure threshold, touch input that exceeds a predetermined pressure threshold, etc.) with respect to the shortcut and/or pinned shortcut, etc.), which causes a menu to be displayed to the user. The menu may display each of the URIs associated with selected shortcut and/or pinned shortcut. The displayed URIs may be user-selectable. Selection of a particular URI of the display URIs causes the browser application to navigate to the selected URI.

Figure 7:
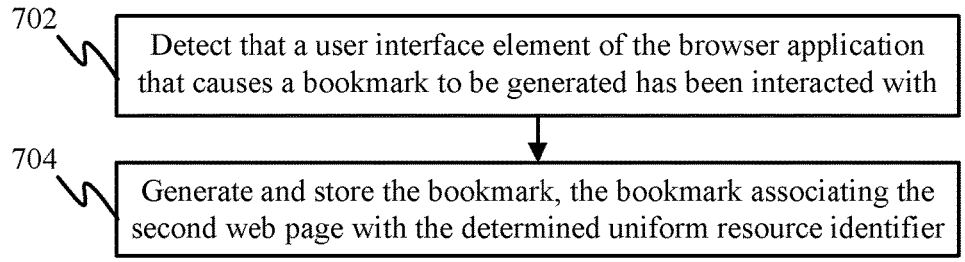
FIG. 7 shows a flowchart of a method for generating a bookmark that associates a web page with an original URI in accordance with an example embodiment.
Figure 8:
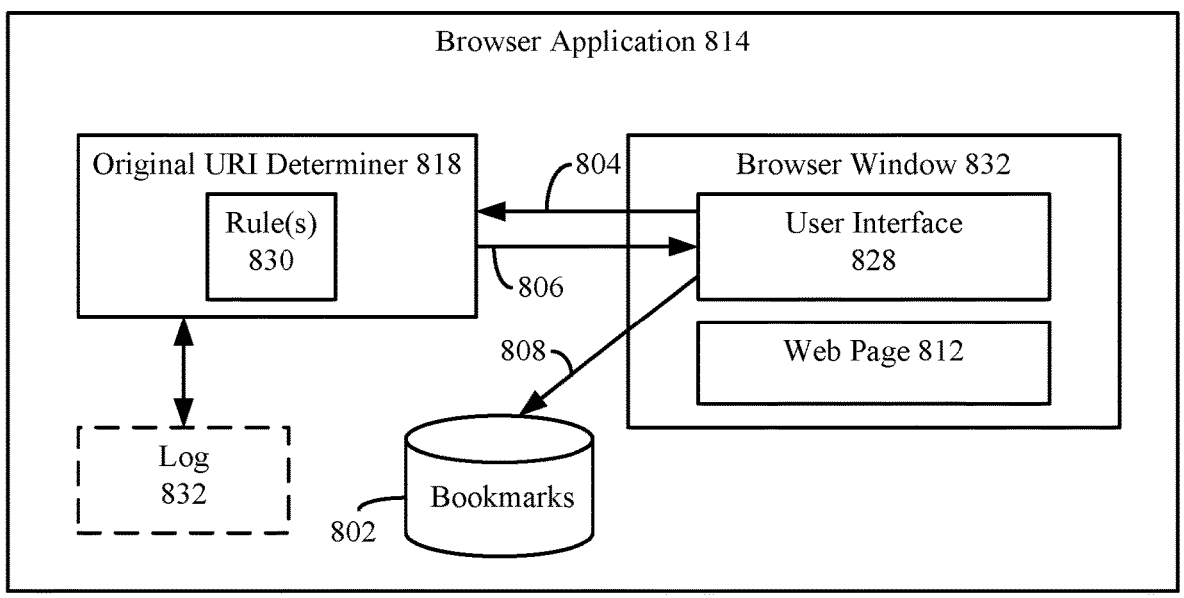
FIG. 8 depicts a block diagram of browser application in accordance with an example embodiment.

Accordingly, a user may be enabled to generate a bookmark that associates a web page with an original URI in many ways. For example, FIG. 7 shows a flowchart 700 of a method for generating a bookmark that associates a web page with an original URI in accordance with an example embodiment. In an embodiment, flowchart 700 may be implemented by a browser application 814, as shown in FIG. 8. Accordingly, for purposes of illustration, flowchart 700 is described with reference to FIG. 8. FIG. 8 depicts a block diagram of browser application 814 in accordance with an example embodiment. Browser application 814 is an example of browser application 114, as described above with reference to FIG. 1. As shown in FIG. 8, browser application 814 comprises an original URI determiner 818, a log 832, and a data storage 802, and displays a browser window 832. Original URI determiner 818 and log 832 are examples of original URI determiner 118 and log 132, as described above with reference to FIG. 1. Browser window 832 is an example of browser window 132 and browser window 532, as respectively described above with reference to FIGS. 1 and 5. Browser window 832 comprises a user interface 828 and displays a web page 812. User interface 828 is an example of user interface 128 and user interface 528, as respectively described above with reference to FIGS. 1 and 5. Web page 812 is an example of web page 112 and web page 512, as respectively described above with reference to FIGS. 1 and 5. Data storage 802 may be any type of physical memory and/or storage device that is described herein, and/or as would be understood by a person of skill in the relevant art(s) having the benefit of this disclosure. Other structural and operational embodiments will be apparent to persons skilled in the relevant art(s) based on the following discussion.

Flowchart 700 of FIG. 7 begins with step 702. In step 702, an interaction with a user interface element of the browser application that causes a bookmark to be generated is detected. For instance, with reference to FIG. 8, user interface 828 detects interaction with a user interface element (e.g., bookmark user interface element 506, as shown in FIG. 5) of browser application 814 that causes a bookmark to be generated. Interaction of the user interface element may cause user interface 828 to provide a command 804 to original URI determiner 818. Command 804 may trigger original URI determiner 818 to determine the original URI to be associated with web page 812. For instance, command 804 may comprise the final redirect URI associated with web page 812. Responsive to receiving command 804, original URI determiner 818 may access log 832 and determine each of the URIs to which browser application 814 was redirected with respect to a particular URI specified by the user. Original URI determiner 818 may apply one or more rule(s) 830 to each of the URIs determined from log 832 to determine an original URI for web page 812 to be associated with the bookmark. Rule(s) 830 are examples of rule(s) 130, as described above with reference to FIG. 1. Original URI determiner 818 provides the determined original URI (shown as original URI 806) to user interface 828.

At step 704, the bookmark is generated and stored, the bookmark associating the second web page with the determined uniform resource identifier. For example, with reference to FIG. 8, user interface 828 may display a user interface window (user interface windows 600A and 600B, as shown in FIGS. 6A and 6B) that enables the user to configure the bookmark to be generated. The user interface window may display original URI 806 (e.g., via second text box 604, as shown in FIG. 6A), which was determined by and received from original URI determiner 818. The user may be enabled to designate a different URI (e.g., the final URI) with web page 812, e.g., via drop-down menu 608, as shown in FIG. 6B). After the user designates a URI, the user may save the bookmark. Browser application 814 stores the bookmark (shown as bookmark 808) in data storage 802.

B. Techniques for Maintaining Redirection Paths Via a Browser History

Figure 9:
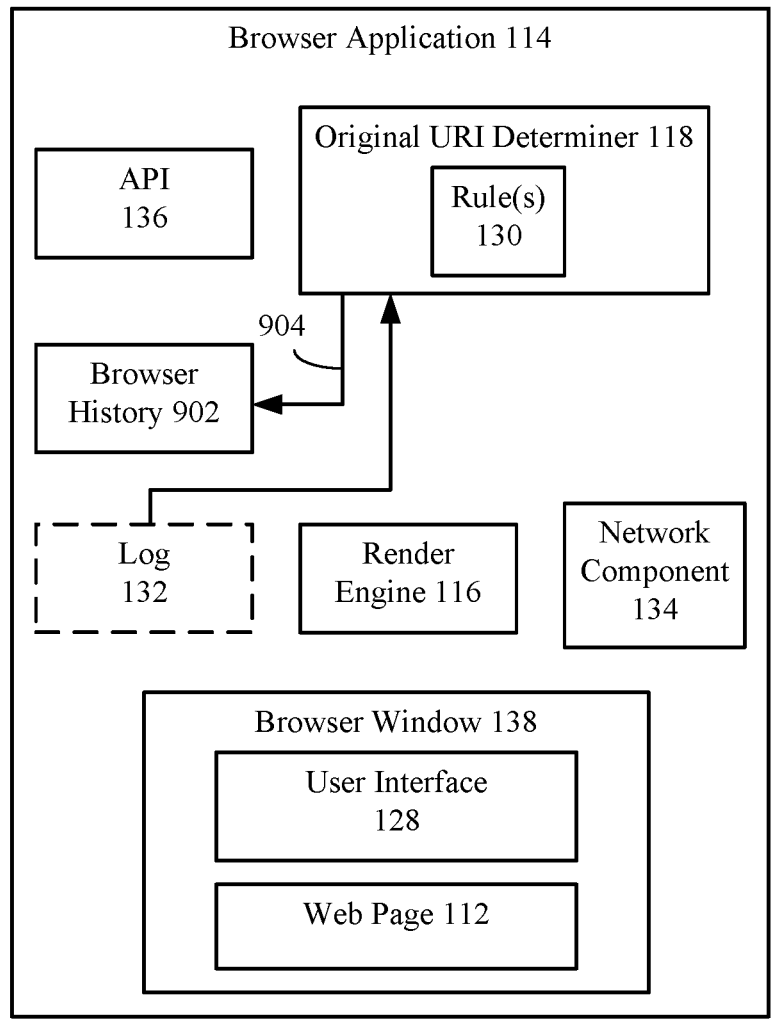
FIG. 9 depicts a block diagram of browser application comprising a browser history in accordance with an example embodiment.

Browser applications generally maintain a browser history, which comprises a listing of web pages that a user has visited. Conventional browser histories associate each web page maintained thereby with that web page's URI. The techniques described herein enable a browser application to maintain a browser history that groups together each URI that was traversed (e.g., via redirection) to reach a particular web page. For example, FIG. 9 depicts a block diagram of browser application 114 comprising such a browser history in accordance with an example embodiment. As shown in FIG. 9, browser application 114 comprises browser history 902.

After browser application 114 has navigated to a particular web page (e.g., web page 112), original URI determiner 118 may analyze log 134 to determine each of the URIs to which browser application 114 was redirected with respect to a particular URI specified by the user. Original URI determiner 118 may apply rule(s) 130 to each of the URIs determined from log 132 to determine an original URI (shown as original URI 904) for web page 112 and/or any other URIs that are in compliance with rule(s) 130. Browser application 114 associates original URI 904 and/or any URIs that are in compliance with rule(s) 130 with the final URI of web page 112 and generates an entry in browser history 902. The entry may be viewed by the user by interacting with a user interface element displayed by user interface 128 and/or interacting with menu option provided by user interface 128. The entry may initially display the original URI (i.e., original URI 904) determined for web page 112. The entry may further be associated with a user interface element that enables the user to view the final redirect URI for web page 112, along with any other URIs to which browser application 114 was redirected when navigating to web page 112. Alternatively, the entry may initially display the final URI, and the user interface element enables the user to view original URI 904 and/or the URIs to which browser application 114 was redirected when navigating to web page 112.

Figure 10A:
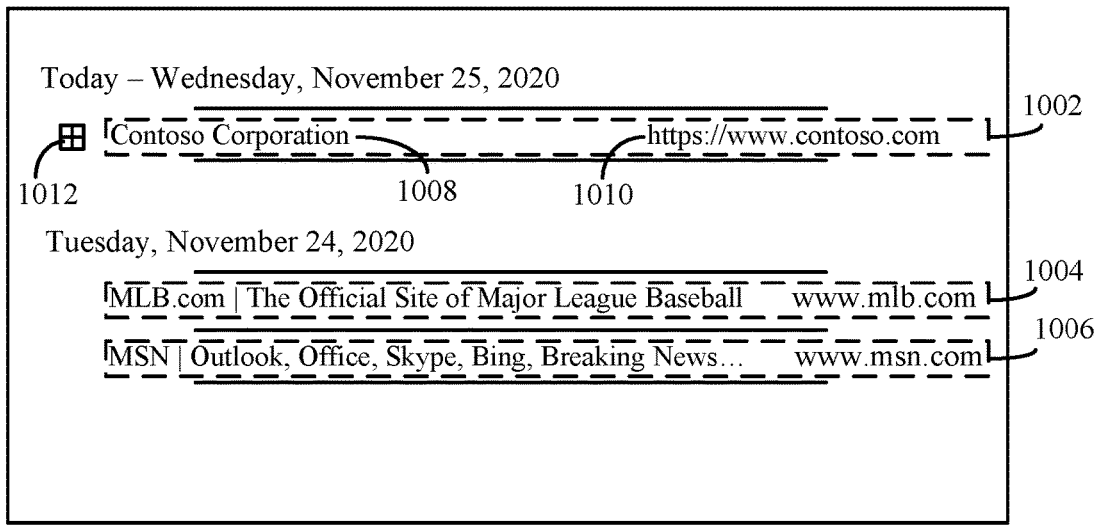
FIGS. 10A-10D depict example browser history windows in accordance with example embodiments.
Figure 10B:
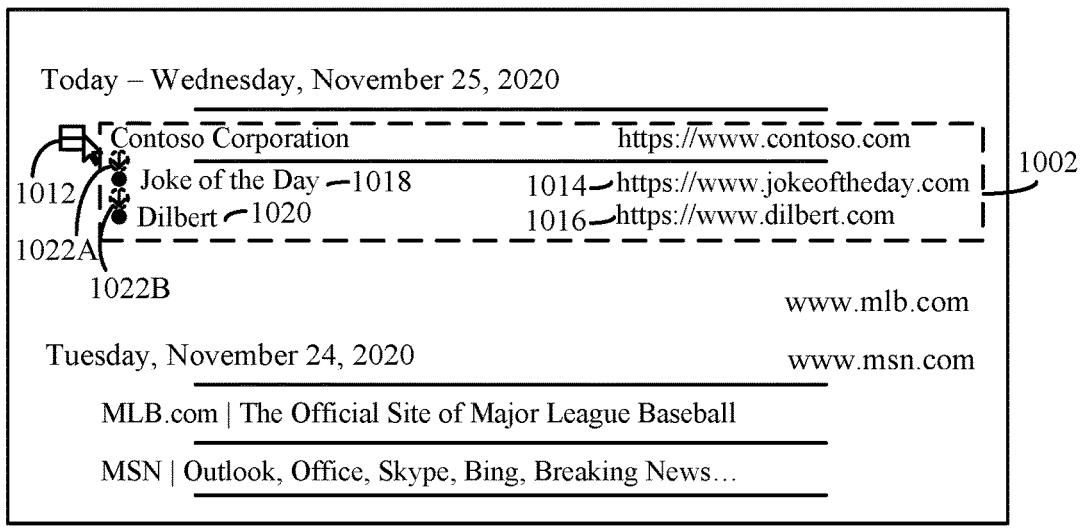

For instance, FIGS. 10A-10B depicts example browser history GUI screens 1000A and 1000B in accordance with example embodiments. As shown in FIG. 10A, GUI screen 1000A comprises a plurality of browser history entries 1002, 1004, and 1006. Browser history entry 1002 represents the entry generated when navigating to web page 112, as described above with reference to FIG. 9. As shown in FIG. 10A, entry 1002 displays a title 1008 and original URI 1010. Original URI 1010 is an example of original URI 904, as described above with reference to FIG. 9. Title 1008 corresponds to the title of the web page (e.g., web page 110, as shown in FIG. 1) associated with original URI 1010. As further shown in FIG. 10A, entry 1002 is associated with a user interface element 1012. User interface element 1012, when interacted with by the user, expands entry 1002 to include the final redirect URI, and/or the URIs to which browser application 114 was redirected when navigating to web page 112.

For example, as shown in FIG. 10B, a user has interacted with user interface 1012. As a result, entry 1002 is now expanded to show a first redirect URI 1014 to which browser application 114 was redirected, along with a second redirect URI 1016 to which browser application 114 was redirected after navigating to first redirect URI 1014. In this example, browser application 114 was redirected multiple times before reaching its final destination (i.e., final URI 1016). In the example shown in FIG. 10B, each of first redirect URI 1014 was in compliance with rule(s) 130, and therefore was associated with entry 1002. However, in certain scenarios, one or more intermediate redirect URIs may not be in compliance with rule(s) 130, and therefore, may be excluded from being associated with entry 1002.

As further shown in FIG. 10B, a title 1018 of the web page located at first redirect URI 1014 may displayed alongside therewith, and a title 1020 of the web page (i.e., web page 112) located at final URI 1016 may be displayed alongside therewith. As also shown in FIG. 10B, indicators 1022A and 1022B may be displayed to represent the order in which browser application 114 traversed original URI 1002, first redirect URI 1014, and final URI 1016. Each of URIs 1010, 1014, and 1016 and their respective titles 1008, 1018, and 1020 are user-selectable. In embodiments, selection of a particular URI or corresponding title causes browser application 114 to navigate to that URI.

In certain scenarios, browser application 114 may not always be redirected to the same final URI. That is, when browser application 114 navigates to a first web page (e.g., first web page 110), browser application 114 may not always be redirected to second web page 112, but instead be redirected to another web page. For instance, the redirect URI may change over time. In accordance with an embodiment, browser application 114 may keep track of the different redirection paths with respect to a particular URI and store each path in browser history 902.

For instance, browser application 114 may be configured to determine whether at least two entries within browser history 902 have the same original URI. Upon determining such entries, browser application 114 may merge the entries to generate a single entry having a root corresponding to the original URI, and multiple branches, each representative of a particular redirection path. The merged entry may be viewed by the user via browser history 902.

Figure 10C:
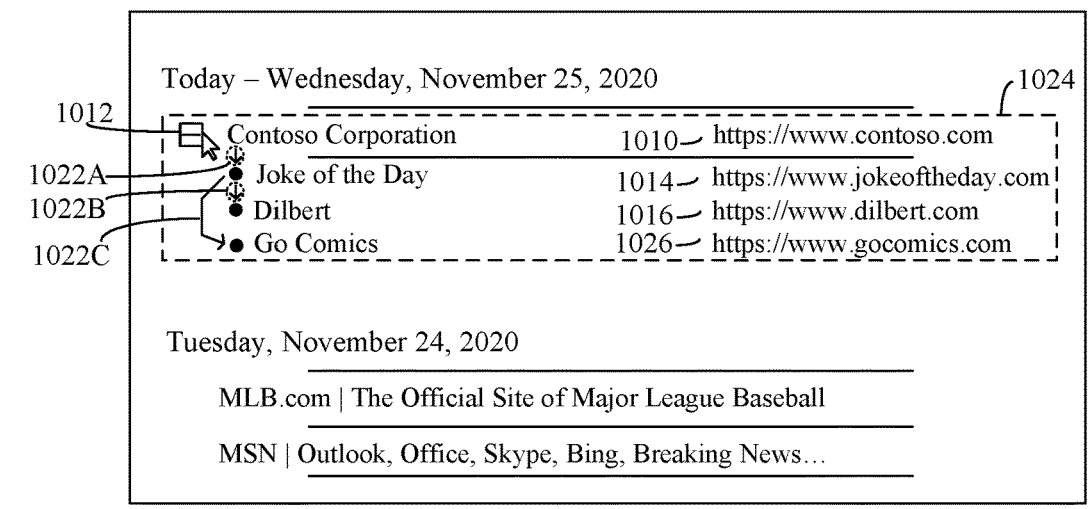

For instance, FIG. 10C depicts an example browser history GUI screen 1000C comprising a merged entry 1024. Initially, merged entry 1024 may appear similar to entry 1002, as described above with reference to FIG. 10A. However, upon interacting with user interface element 1012, merged entry 1024 is expanded to show all of the redirection paths. As shown in FIG. 10C, merged entry 1024 is expanded to show two redirection paths. Original URI 1010 represents the root of merged entry 1024. The first of the two redirection paths comprises original URI 1010, which was redirected to URI 1014, and then to URI 1016. The second of the two redirection paths comprises original URI 1010, which was redirected to URI 1014, and then to URI 1026. The first redirection path may be represented by indicators 1022A and 1022B. The second redirection path may be represented by indicators 1022A and 1022C. Each of URIs 1010, 1014, 1016, and 1026 and their respective titles are user-selectable. Selection of a particular URI or title causes browser application 114 to navigate to that URI.

Figure 10D:
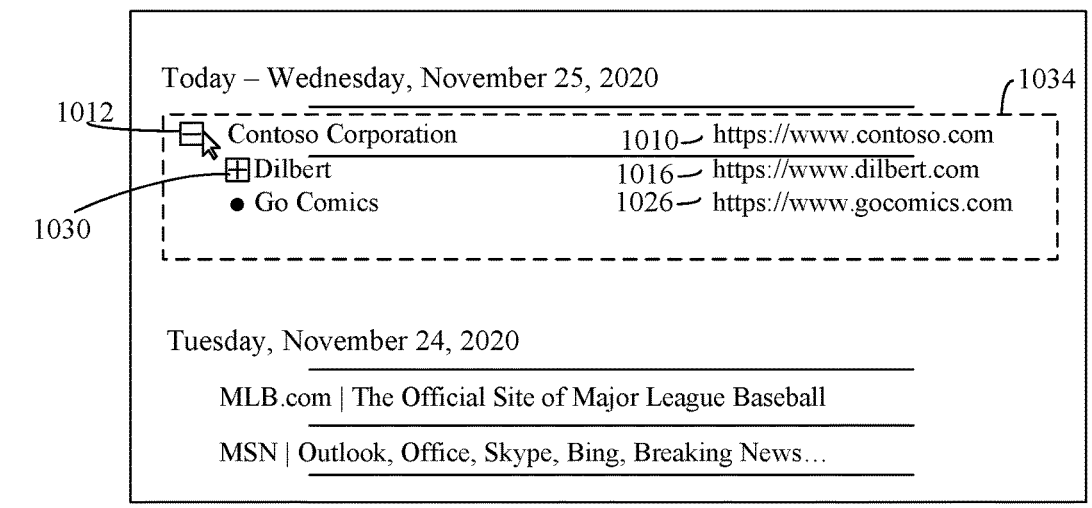

FIG. 10D depicts the same browser history as in FIG. 10C, with a different merged entry 1034. FIG. 10D shows the original URI 1012 with two child items, each representing a corresponding final URI (1016, 1026). The final URI item 1016 further shows a user interface element 1030 that, similar to user interface element 1012, can be expanded to show its own child items. In embodiments, interaction with the user interface element 1030 would show any corresponding redirect line items (e.g., 1022A & 1022B) that occurred between the original URI 1012 and that particular final URI 1016. As can be seen by the line item that includes URI 1026 in merged entry 1034, in embodiments, the user interface element to expand child items may exist only when such child items exist. In other words, the hierarchal first level may be the original URI, a lower level may be the final URIs for that original URI, and each final URI may have lower levels with redirect URIs.

Figure 11:
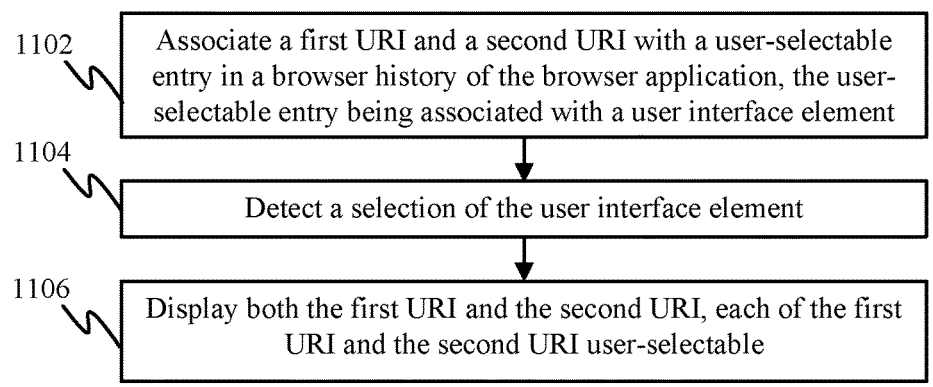
FIG. 11 shows a flowchart of a method for grouping multiple URIs via a browser history in accordance with an example embodiment.

Accordingly, a browser application may be configured to group multiple URIs via a browser history in many ways. For example, FIG. 11 shows a flowchart 1100 of a method for grouping multiple URIs via a browser history in accordance with an example embodiment. In an embodiment, flowchart 1100 may be implemented by browser application 114, as shown in FIG. 9. Accordingly. for purposes of illustration, flowchart 11 is described with reference to FIG. 9. Other structural and operational embodiments will be apparent to persons skilled in the relevant art(s) based on the following discussion.

Flowchart 1100 of FIG. 11 begins with step 1102. In step 1102, a first URI and a second URI are associated with a user-selectable entry in a browser history of the browser application. The user-selectable entry is associated with a user interface element. For example, with reference to FIG. 9, browser application 114 associates original URI 904 and at least the final URI associated with web page 112 with a user-selectable entry in browser history 902.

At step 1104, a selection of the user interface element is detected. For example, with reference to FIG. 9, user interface 128 detects selection of the user interface element (e.g., user interface element 1012, as shown in FIGS. 10A-10B).

At step 1106, both the first URI and the second URI are displayed. Each of the first URI and the second URI are user-selectable. For example, with reference to FIG. 9, user interface 128 displays both original URI 904 and at least the final URI associated with web page 112. As shown in FIG. 10B, after a user selects user interface element 1012, original URI 1010, first redirect URI 1014 and final URI 1016 are displayed. Each of URIs 1010, 1014, and 1016 are user-selectable. Selection of URIs 1010, 1014, and 1016 cause browser application 114 to navigate to a web page corresponding thereto.

C. Techniques for Storing an Original URI Reference Via a Clipboard Buffer

Figure 12:
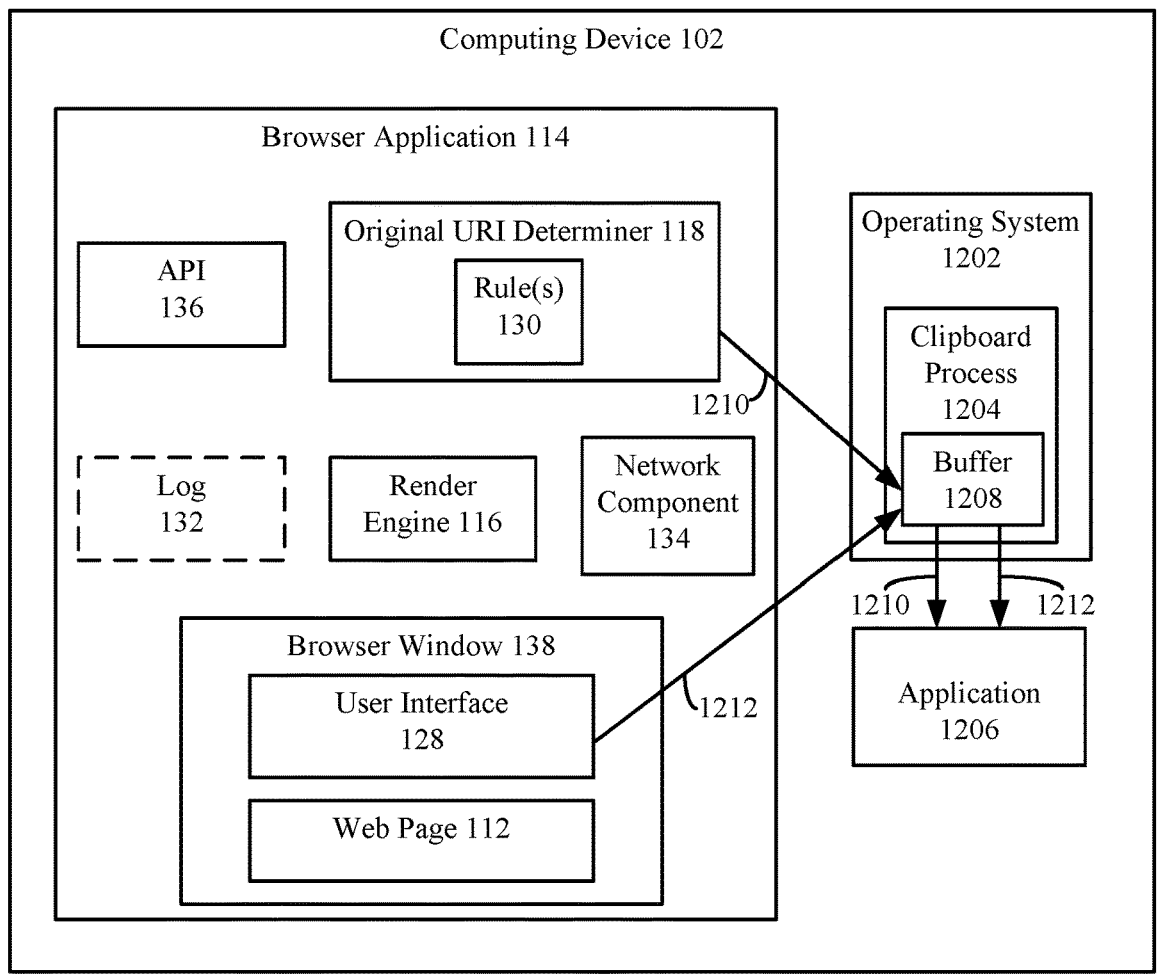
FIG. 12 depicts a block diagram of a computing device comprising an operating system that manages a clipboard process in accordance with an example embodiment.

FIG. 12 depicts a block diagram of computing device 102 comprising an operating system that manages a clipboard process in accordance with an example embodiment. As shown in FIG. 12, computing device 102 comprises an operating system 1202 and another application 1206. Operating system 1202 comprises a clipboard process 1204, which maintains a buffer 1208. Operating system 1202 may manage one or more hardware components and software (e.g., browser application 114, application 906, etc.) executing on computer system 102. Example hardware components of computing device 102 are described in detail below in reference to FIG. 16-17. Examples of operating system 1202 include, but are not limited to, the Microsoft Windows® Operating System, published by Microsoft Corporation, macOS® published by Apple Computer, etc. Examples of application 1206, include, but are not limited to, a word processing application (e.g., Microsoft Word® published by Microsoft® Corporation), an e-mail application (e.g., Microsoft Outlook® published by Microsoft® Corporation), a presentation application (e.g., Microsoft PowerPoint® published by Microsoft® Corporation), or any other application that is configured to utilize buffer 1208.

Clipboard process 1204 is configured to detect copy operations and paste operations initiated via various applications (e.g., browser application 114, application 906, etc.). Responsive to detecting a copy operation via an application, clipboard process 904 stores the contents that are copied via the copy operation into buffer 1208, along with formatting data describing a format of the contents stored in buffer 1208 Responsive to detecting a paste operation via an application, clipboard process 1204 provides access to the various formats of the contents stored in buffer 1208.

In accordance with an embodiment, original URIs determined by original URI determiner 118 and/or the final redirect URI are stored buffer 1208 responsive to a copy operation. For instance, when a user provides user input to copy a final redirect URI displayed in an address bar of user interface 128, original URI determiner 118 may determine and/or provide the determined original URI (shown as original URI 1210) to buffer 1208. Original URI determiner 118 may determine original URI 1210 based on an application of rule(s) 130, as described above with reference to FIG. 1. Original URI determiner 118 may further specify a format of original URI 1210. For example, original URI determiner 118 may specify that the URI being provided to buffer 1208 is an original URI. User interface 128 may also provide the final redirect URI (shown as final redirect URI 912) to buffer 1208. User interface 128 may further specify a format of final redirect URI 1212. For example, user interface 128 may specify that the URI being provided to buffer 1208 is the final redirect URI that is displayed in the address bar of user interface 128. Examples of user input for copying text, include, but are not limited to highlighting the text (e.g., the final redirect URI) and pressing a combination of one or more keys (e.g., CTRL+C) on a keyboard, selecting a menu option made available, e.g., via user interface 128 and/or operating system 1202, etc.

When a user provides input to perform a paste operation, e.g., via application 906, original URI 1210 and/or final redirect URI 1212 may be provided as options for pasting via a menu. Each option may be presented with the format of the option in accordance with the formatting data provided by original URI determiner 118 and user interface 128. This way, the user can easily choose which of URIs 1210 or 1212 he or she would like to paste. Examples of user input for pasting text, include, but are not limited to pressing a combination of one or more keys (e.g., CTRL+V) on a keyboard, selecting a menu option made available via application 906, etc.

Figure 13:
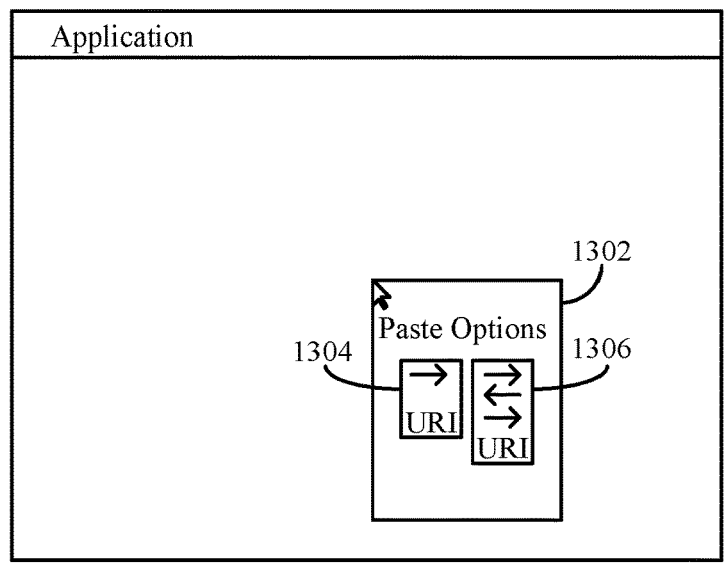
FIG. 13 depicts an example application window that displays a graphical user interface (GUI) menu for presenting and pasting different URIs in accordance with an example embodiment.

FIG. 13 depicts an example application window 1300 that displays a GUI menu 1302 for presenting and pasting different URIs in accordance with an example embodiment. Application window 1300 may be an application window presented for application 1206, as described above with reference to FIG. 12. As shown in FIG. 13, a user causes GUI menu 1302 to be displayed within application window 1300, e.g., by right-clicking in application window 1300. GUI menu 1302 may display a plurality of different paste options for a user to select (along with many other different menu options, which are not shown for the sake of brevity). As shown in FIG. 13, a first paste option 1304 and a second paste option 1306 are presented. First paste option 1304 may correspond to original URI 1210, and second paste option 1306 may correspond to final, redirected URI 1212, or vice versa. First paste option 1304 may be presented in accordance with the formatting data provided by original URI determiner 118, and second paste option 1306 may be presented in accordance with the formatting data provided by user interface 128. This way, the user can easily distinguish between the two options. For instance, the formatting data specified by original URI determiner 118 indicates that the URI provided to buffer 1208 (i.e., original URI 1210) is an original URI. Accordingly, first page option 1304 is displayed with an icon indicative of an original URI (e.g., a single arrow, which represents a single request sent for a single URI). The formatting data specified by user interface 128 indicates that the URI provided to buffer 1208 (i.e., final redirect URI 1210) is a final redirect URI. Accordingly, second page option 1304 is displayed with an icon indicative of a final, redirect URI (e.g., multiple arrows indicating the initial request, the received redirect message, and the subsequent request for the redirect URI). It is noted that the icons shown for first paste option 1304 and second paste option 1306 of FIG. 13 are purely exemplary and shown for illustrative purposes and that first paste option 1304 and second paste option 1306 may be displayed in any manner to effectively distinguish between the different types of URIs.

Figure 14:
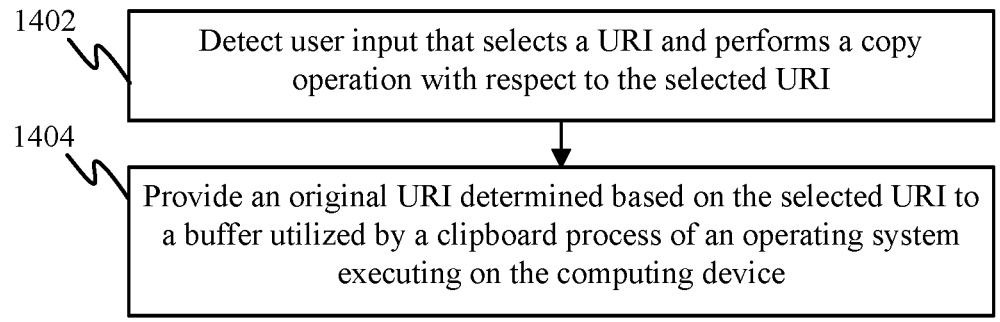
FIG. 14 shows a flowchart of a method for storing a reference to a URI in a clipboard buffer in accordance with an example embodiment.

Accordingly, a reference to a URI may be stored in a clipboard buffer in many ways. For example, FIG. 14 shows a flowchart 1400 of a method for storing a reference to a URI in a clipboard buffer in accordance with an example embodiment. In an embodiment, flowchart 1400 may be implemented by browser application 114, as shown in FIG. 12. Accordingly. for purposes of illustration, flowchart 1400 is described with reference to FIG. 12. Other structural and operational embodiments will be apparent to persons skilled in the relevant art(s) based on the following discussion.

Flowchart 1400 of FIG. 14 begins with step 1402. In step 1402, user input is detected that selects a URI and performs a copy operation with respect to the selected URI. For example, with reference to FIG. 12, user interface 128 detects user input that selects a URI (e.g., displayed in an address bar of user interface 128) and performs a copy operation with respect to the selected URI.

In step 1404, an original URI determined based on the selected URI is provided to a buffer utilized by a clipboard process of an operating system executing on the computing device. For example, with reference to FIG. 12, responsive to the user performing the user input, original URI determiner 118 determines and provides original URI 1210 to buffer 1208 utilized by clipboard process 1204 of operating system 1202.

Figure 15:
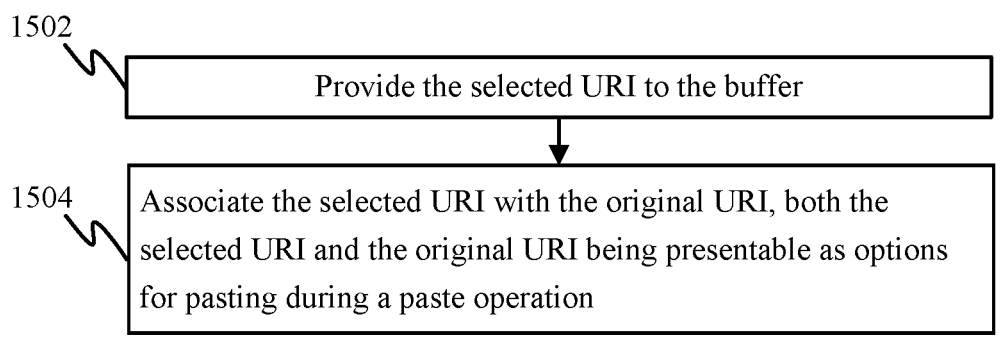
FIG. 15 shows a flowchart of a method for storing both a selected URI and a determined original URI in a clipboard buffer in accordance with an example embodiment.

In accordance with one or more embodiments, both the original URI and the selected URI may be provided to the buffer. For example, FIG. 15 shows a flowchart 1500 of a method for storing both a selected URI and a determined original URI in a clipboard buffer in accordance with an example embodiment. In an embodiment, flowchart 1500 may be implemented by browser application 114, as shown in FIG. 12. Accordingly. for purposes of illustration, flowchart 1500 is described with reference to FIG. 12. Other structural and operational embodiments will be apparent to persons skilled in the relevant art(s) based on the following discussion.

Flowchart 1500 of FIG. 15 begins with step 1502. In step 1502, the selected URI is provided to the buffer. For example, with reference to FIG. 12, user interface 128 provides a URI selected from an address bar of user interface 128 (i.e., the final redirect URI 1212)

In step 1504, the selected URI is associated with the original URI. Both the selected URI and the original URI are presentable as options for pasting during a paste operation. For example, with reference to FIG. 12, clipboard process 1204 associates original URI 1210 with final redirect URI 1212. As shown in FIG. 13, paste options 1304 and 1306 are presented to the user via menu 1302. Paste option 1304 may correspond to original URI 1210, and paste option 1306 may correspond to final redirect URI 1308.

III. Example Mobile and Stationary Device Embodiments

The systems and methods described above in reference to FIGS. 1-15, may be implemented in hardware, or hardware combined with one or both of software and/or firmware. For example, system 100, browser window 500, user interface windows 600A and 600B, browser application 814, browser application 114 (as described in FIGS. 1, 9, and 12), browser history GUI screens 1000A-1000D, computing device 102 (as described in FIGS. 1 and 12), application window 1300, and/or each of the components described therein, and flowcharts 200, 300, 400, 700, 1100, 1400, and/or 1500 may be each implemented as computer program code/instructions configured to be executed in one or more processors and stored in a computer readable storage medium. Alternatively, system 100, browser window 500, user interface windows 600A and 600B, browser application 814, browser application 114 (as described in FIGS. 1, 9, and 12), browser history GUI screens 1000A-1000D, computing device 102 (as described in FIGS. 1 and 12), application window 1300, and/or each of the components described therein, and flowcharts 200, 300, 400, 700, 1100, 1400, and/or 1500 may be implemented as hardware logic/electrical circuitry. In an embodiment, system 100, browser window 500, user interface windows 600A and 600B, browser application 814, browser application 114 (as described in FIGS. 1, 9, and 12), browser history GUI screens 1000A-1000D, computing device 102 (as described in FIGS. 1 and 12), application window 1300, and/or each of the components described therein, and flowcharts 200, 300, 400, 700, 1100, 1400, and/or 1500 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 16:
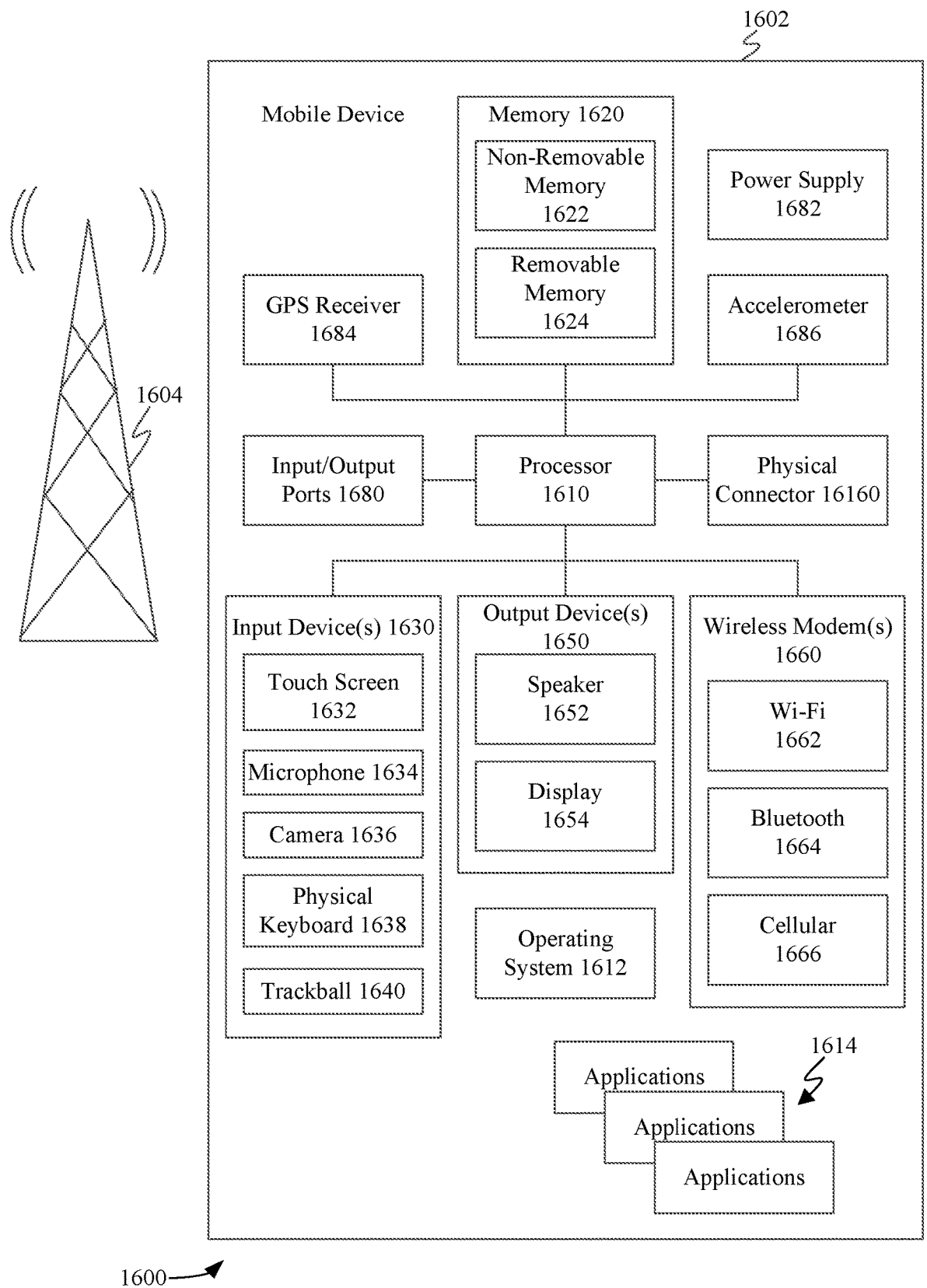
FIG. 16 is a block diagram of an exemplary user device in which embodiments may be implemented.

FIG. 16 shows a block diagram of an exemplary mobile device 1600 including a variety of optional hardware and software components, shown generally as components 1602. Any number and combination of the features/elements of system 100, browser window 500, user interface windows 600A and 600B, browser application 814, browser application 114 (as described in FIGS. 1, 9, and 12), browser history GUI screens 1000A-1000D, computing device 102 (as described in FIGS. 1 and 12), application window 1300, and/or each of the components described therein, and flowcharts 200, 300, 400, 700, 1100, 1400, and/or 1500 may be implemented as components 1602 included in a mobile device embodiment, as well as additional and/or alternative features/elements, as would be known to persons skilled in the relevant art(s). It is noted that any of components 1602 can communicate with any other of components 1602, although not all connections are shown, for ease of illustration. Mobile device 1600 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 1604, such as a cellular or satellite network, or with a local area or wide area network.

The illustrated mobile device 1600 can include a controller or processor referred to as processor circuit 1610 for performing such tasks as signal coding, image processing, data processing, input/output processing, power control, and/or other functions. Processor circuit 1610 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1610 may execute program code stored in a computer readable medium, such as program code of one or more applications 1614, operating system 1612, any program code stored in memory 1620, etc. Operating system 1612 can control the allocation and usage of the components 1602 and support for one or more application programs 1614 (a.k.a. applications, "apps", etc.). Application programs 1614 can include common mobile computing applications (e.g., email applications, calendars, contact managers, web browsers, messaging applications) and any other computing applications (e.g., word processing applications, mapping applications, media player applications).

As illustrated, mobile device 1600 can include memory 1620. Memory 1620 can include non-removable memory 1622 and/or removable memory 1624. The non-removable memory 1622 can include RAM, ROM, flash memory, a hard disk, or other well-known memory storage technologies. The removable memory 1624 can include flash memory or a Subscriber Identity Module (SIM) card, which is well known in GSM communication systems, or other well-known memory storage technologies, such as "smart cards." The memory 1620 can be used for storing data and/or code for running operating system 1612 and applications 1614. Example data can include web pages, text, images, sound files, video data, or other data sets to be sent to and/or received from one or more network servers or other devices via one or more wired or wireless networks. Memory 1620 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1620. These programs include operating system 1612, one or more application programs 1614, and other program modules and program data. Examples of such application programs or program modules may include, for example, computer program logic (e.g., computer program code or instructions) for implementing the systems described above, including the embodiments described in reference to FIGS. 1-15.

Mobile device 1600 can support one or more input devices 1630, such as a touch screen 1632, microphone 1634, camera 1636, physical keyboard 1638 and/or trackball 1640 and one or more output devices 1650, such as a speaker 1652 and a display 1654.

Other possible output devices (not shown) can include piezoelectric or other haptic output devices. Some devices can serve more than one input/output function. For example, touch screen 1632 and display 1654 can be combined in a single input/output device. The input devices 1630 can include a Natural User Interface (NUI).

Wireless modem(s) 1660 can be coupled to antenna(s) (not shown) and can support two-way communications between processor circuit 1610 and external devices, as is well understood in the art. The modem(s) 1660 are shown generically and can include a cellular modem 1666 for communicating with the mobile communication network 1604 and/or other radio-based modems (e.g., Bluetooth 1664 and/or Wi-Fi 1662). Cellular modem 1666 may be configured to enable phone calls (and optionally transmit data) according to any suitable communication standard or technology, such as GSM, 3G, 4G, 5G, etc. At least one of the wireless modem(s) 1660 is typically configured for communication with one or more cellular networks, such as a GSM network for data and voice communications within a single cellular network, between cellular networks, or between the mobile device and a public switched telephone network (PSTN).

Mobile device 1600 can further include at least one input/output port 1680, a power supply 1682, a satellite navigation system receiver 1684, such as a Global Positioning System (GPS) receiver, an accelerometer 1686, and/or a physical connector 1690, which can be a USB port, IEEE 1394 (FireWire) port, and/or RS-232 port. The illustrated components 1602 are not required or all-inclusive, as any components can be not present and other components can be additionally present as would be recognized by one skilled in the art.

Figure 17:
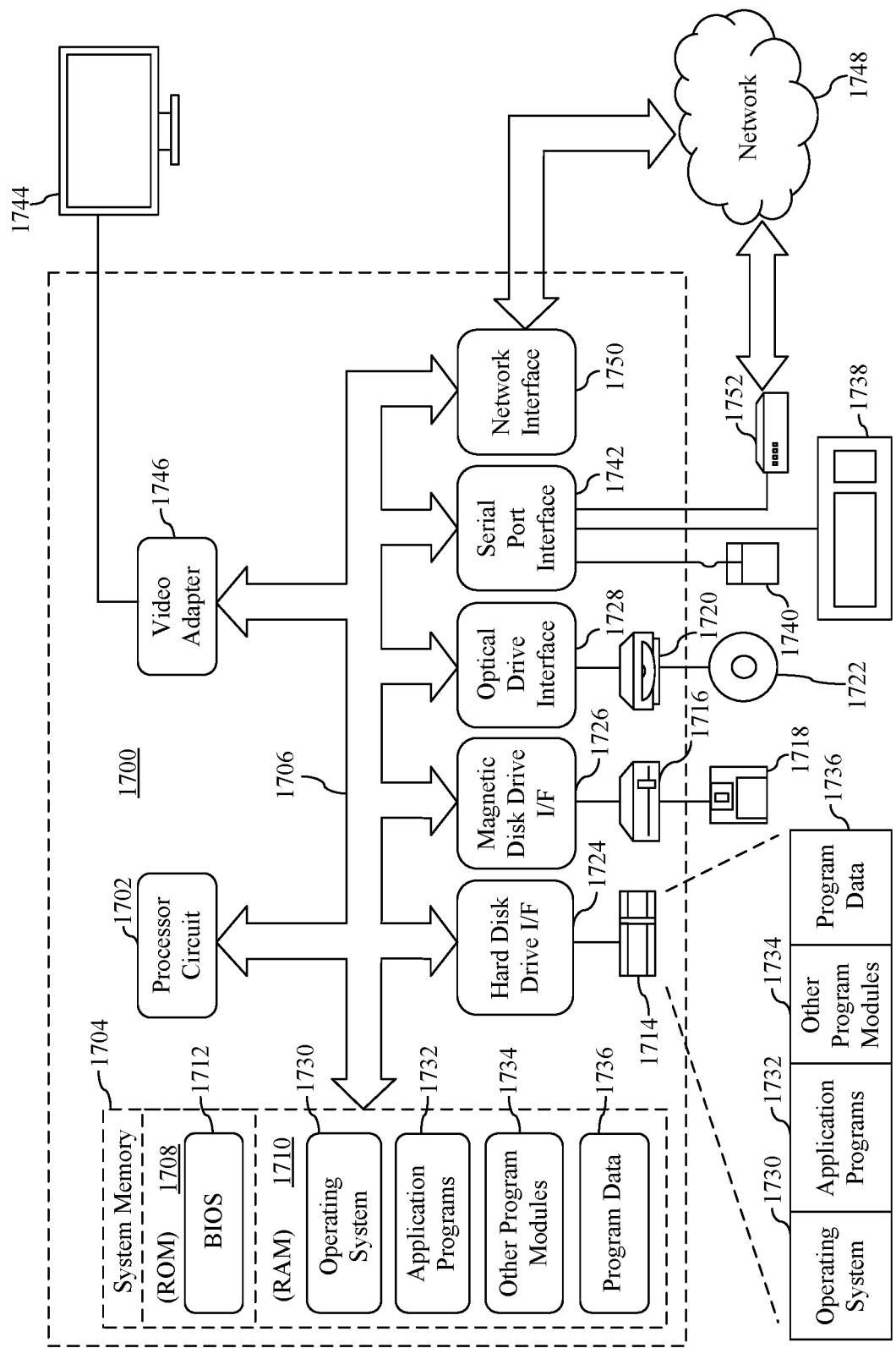
FIG. 17 is a block diagram of an example processor-based computer system that may be used to implement various embodiments.

Furthermore, FIG. 17 depicts an exemplary implementation of a computing device 1000 in which embodiments may be implemented, including system 100, browser window 500, user interface windows 600A and 600B, browser application 814, browser application 114 (as described in FIGS. 1, 9, and 12), browser history GUI screens 1000A-1000D, computing device 102 (as described in FIGS. 1 and 12), application window 1300, and/or each of the components described therein, and flowcharts 200, 300, 400, 700, 1100, 1400, and/or 1500. The description of computing device 1700 provided herein is provided for purposes of illustration, and is not intended to be limiting. Embodiments may be implemented in further types of computer systems, as would be known to persons skilled in the relevant art(s).

As shown in FIG. 17, computing device 1700 includes one or more processors, referred to as processor circuit 1702, a system memory 1704, and a bus 1706 that couples various system components including system memory 1704 to processor circuit 1702. Processor circuit 1702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1702 may execute program code stored in a computer readable medium, such as program code of operating system 1730, application programs 1732, other programs 1734, etc. Bus 1706 represents one or more of any of several types of bus structures, including a memory bus or memory controller, a peripheral bus, an accelerated graphics port, and a processor or local bus using any of a variety of bus architectures. System memory 1704 includes read only memory (ROM) 1708 and random access memory (RAM) 1710. A basic input/output system 1712 (BIOS) is stored in ROM 1708.

Computing device 1700 also has one or more of the following drives: a hard disk drive 1714 for reading from and writing to a hard disk, a magnetic disk drive 1716 for reading from or writing to a removable magnetic disk 1718, and an optical disk drive 1720 for reading from or writing to a removable optical disk 1722 such as a CD ROM, DVD ROM, or other optical media. Hard disk drive 1714, magnetic disk drive 1716, and optical disk drive 1720 are connected to bus 1706 by a hard disk drive interface 1724, a magnetic disk drive interface 1726, and an optical drive interface 1728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1730, one or more application programs 1732, other programs 1734, and program data 1736. Application programs 1732 or other programs 1734 may include, for example, computer program logic (e.g., computer program code or instructions) for implementing the systems described above, including the embodiments described above with reference to FIGS. 1-15.

A user may enter commands and information into the computing device 1700 through input devices such as keyboard 1738 and pointing device 1740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1702 through a serial port interface 1742 that is coupled to bus 1706, but may be connected by other interfaces, such as a parallel port, game port, or a universal serial bus (USB).

A display screen 1744 is also connected to bus 1706 via an interface, such as a video adapter 1746. Display screen 1744 may be external to, or incorporated in computing device 1700. Display screen 1744 may display information, as well as being a user interface for receiving user commands and/or other information (e.g., by touch, finger gestures, a virtual keyboard, by providing a tap input (where a user lightly presses and quickly releases display screen 1744), by providing a "touch-and-hold" input (where a user touches and holds his finger (or touch instrument) on display screen 1744 for a predetermined period of time), by providing touch input that exceeds a predetermined pressure threshold, etc.). In addition to display screen 1744, computing device 1700 may include other peripheral output devices (not shown) such as speakers and printers.

Computing device 1700 is connected to a network 1748 (e.g., the Internet) through an adaptor or network interface 1750, a modem 1752, or other means for establishing communications over the network. Modem 1752, which may be internal or external, may be connected to bus 1706 via serial port interface 1742, as shown in FIG. 17, or may be connected to bus 1706 using another interface type, including a parallel interface.

As used herein, the terms "computer program medium," "computer-readable medium," and "computer-readable storage medium" are used to generally refer to physical hardware media such as the hard disk associated with hard disk drive 1714, removable magnetic disk 1718, removable optical disk 1722, other physical hardware media such as RAMs, ROMs, flash memory cards, digital video disks, zip disks, MEMs, nanotechnology-based storage devices, and further types of physical/tangible hardware storage media (including system memory 1704 of FIG. 17). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1732 and other programs 1734) may be stored on the hard disk, magnetic disk, optical disk, ROM, RAM, or other hardware storage medium. Such computer programs may also be received via network interface 1750, serial port interface 1752, or any other interface type. Such computer programs, when executed or loaded by an application, enable computing device 1700 to implement features of embodiments discussed herein. Accordingly, such computer programs represent controllers of the computing device 1700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method in a computing device is described herein. The method comprises: detecting a first user interaction that causes a browser application to navigate to a first web page, the first web page associated with a first uniform resource identifier; detecting that the browser application has been redirected to a second web page, the second web page associated with a second uniform resource identifier; applying at least one rule to the first uniform resource identifier and the second uniform resource identifier to determine which of the first uniform resource identifier and the second uniform resource identifier is to be associated with the second web page; detecting a second user interaction to store a reference to the second web page; and responsive to detecting the second user interaction to store the reference to the second web page, generating and storing the reference that associates at least the determined uniform resource identifier with the second web page.

In one embodiment of the foregoing method, detecting the first user interaction comprises one of: detecting entry of the first uniform resource identifier into an address bar of the browser application; detecting selection of a hyperlink that causes the browser application to navigate to the first uniform resource identifier; detecting a third user interaction with a user interface element displayed via a third web page, the third user interaction causing the browser application to execute a script, the script causing the browser application to navigate to the first web page; detecting selection of a bookmark maintained by the browser application, the bookmark corresponding to the first uniform resource identifier; or detecting selection of a shortcut associated with the first uniform resource identifier.

In one embodiment of the foregoing method, detecting that the browser application has been redirected to the second web page comprises: providing a network request to a server based on the first uniform resource identifier; and receiving a network response from the server that specifies the second uniform resource identifier and a status code that indicates that the browser application is to redirect to the second uniform resource identifier.

In one embodiment of the foregoing method, detecting that the browser application has been redirected to the second web page comprises: detecting a refresh tag in a header of the first web page, the refresh tag associated with a content attribute value that has a predetermined relationship with a predetermined value and associated with the second uniform resource identifier.

In one embodiment of the foregoing method, the at least one rule comprises at least one of: a first rule that: determines whether a first response message received in response to navigating to the first web page comprises a first metadata tag that indicates that the first uniform resource identifier is to be excluded from association with the second web page; and determines whether a second response message received in response to navigating to the second web page comprises a second metadata tag that indicates that the second uniform resource identifier is to be excluded from association with the second web page; or a second rule that: determines whether the first uniform resource identifier and the second uniform resource identifier match a predetermined pattern or match a particular uniform resource identifier included in a predetermined list of uniform resource identifiers; excludes the first uniform resource identifier from being associated with the second web page responsive to determining that the first uniform resource identifier matches the predetermined pattern or matches the particular uniform resource identifier; and excludes the second uniform resource identifier from being associated with the second web page responsive to determining that the second uniform resource identifier matches the predetermined pattern or matches the particular uniform resource identifier.

In one embodiment of the foregoing method, said detecting the second user interaction to store the reference to the second web page comprises: detecting that a user interface element of the browser application that causes a bookmark to be generated has been interacted with, wherein said generating and storing the reference that associates at least the determined uniform resource identifier with the second web page comprises, generating and storing the bookmark, the bookmark associating the second web page with the determined uniform resource identifier, and wherein the reference comprises the bookmark.

In one embodiment of the foregoing method, the determined uniform resource identifier comprises the first uniform resource identifier, the method further comprising: associating both the first uniform resource identifier and the second uniform resource identifier with the bookmark.

In one embodiment of the foregoing method, the determined uniform resource identifier comprises the first uniform resource identifier, the method further comprising: presenting a user interface element that enables a user to select either the first uniform resource identifier or the second uniform resource identifier to be associated with the bookmark.

In one embodiment of the foregoing method, detecting the second user interaction to store the reference to the second web page comprises: detecting user input that selects the second uniform resource identifier and performs a copy operation with respect to the second uniform resource identifier; wherein said generating and storing the reference that associates at least the determined uniform resource identifier with the second web page comprises, providing the determined uniform resource identifier to a buffer utilized by a clipboard process of an operating system executing on the computing device, and wherein the reference comprises the determined uniform resource identifier provided to and stored in the buffer.

In one embodiment of the foregoing method, the determined uniform resource identifier comprises the first uniform resource identifier, the method further comprising: providing the second uniform resource identifier to the buffer; and associating the second uniform resource identifier with the first uniform resource identifier, wherein both the first uniform resource identifier and the second uniform resource identifier are presentable as options for pasting during a paste operation.

In one embodiment of the foregoing method, the method further comprises: storing the determined uniform resource identifier as a user-selectable entry in a browser history of the browser application.

In one embodiment of the foregoing method, the determined uniform resource identifier comprises the first uniform resource identifier, the method further comprising:

associating the second uniform resource identifier with the user-selectable entry, the user-selectable entry associated with a user interface element; detecting a selection of the user interface element; responsive to detecting the selection of the user interface element, displaying both the first uniform resource identifier and the second uniform resource identifier, each of the first uniform resource identifier and the second uniform resource identifier user-selectable.

In one embodiment of the foregoing method, the determined uniform resource identifier comprises the first uniform resource identifier, and wherein said generating and storing the reference that associates at least the determined uniform resource identifier with the second web page comprises: determining whether the first uniform resource is identical to the second uniform resource identifier; responsive to determining that the first uniform resource identifier is not identical to the second uniform resource identifier, generating and storing the reference that associates both the first uniform resource identifier and the second uniform resource identifier with the second web page; and responsive to determining that the first uniform resource identifier is identical to the second uniform resource identifier, generating and storing the reference that associates the first uniform resource identifier with the second web page and not the second uniform resource identifier.

A system is also described herein. The system includes at least one processor circuit; and at least one memory that stores program code configured to be executed by the at least one processor circuit, the program code comprising: a browser application configured to: detect a first user interaction that causes the browser application to navigate to a first web page, the first web page associated with a first uniform resource identifier; detect that the browser application has been redirected to a second web page, the second web page associated with a second uniform resource identifier; apply at least one rule to the first uniform resource identifier and the second uniform resource identifier to determine which of the first uniform resource identifier and the second uniform resource identifier is to be associated with the second web page; detect a second user interaction to store a reference to the second web page; and responsive to detecting the second user interaction to store the reference to the second web page, generate and store the reference that associates at least the determined uniform resource identifier with the second web page.

In one embodiment of the foregoing system, the browser application is further configured to: detect entry of the first uniform resource identifier into an address bar of the browser application; detect selection of a hyperlink that causes the browser application to navigate to the first uniform resource identifier; detect a third user interaction with a user interface element displayed via a third web page, the third user interaction causing the browser application to execute a script, the script causing the browser application to navigate to the first web page; detect selection of a bookmark maintained by the browser application, the bookmark corresponding to the first uniform resource identifier; or detect selection of a shortcut associated with the first uniform resource identifier.

In one embodiment of the foregoing system, the at least one rule comprises at least one of: a first rule that: determines whether a first response message received in response to navigating to the first web page comprises a first metadata tag that indicates that the first uniform resource identifier is to be excluded from association with the second web page; and determines whether a second response message received in response to navigating to the second web page comprises a second metadata tag that indicates that the second uniform resource identifier is to be excluded from association with the second web page; or a second rule that: determines whether the first uniform resource identifier and the second uniform resource identifier match a predetermined pattern or match a particular uniform resource identifier included in a predetermined list of uniform resource identifiers; excludes the first uniform resource identifier from being associated with the second web page responsive to determining that the first uniform resource identifier matches the predetermined pattern or matches the particular uniform resource identifier; and excludes the second uniform resource identifier from being associated with the second web page responsive to determining that the second uniform resource identifier matches the predetermined pattern or matches the particular uniform resource identifier.

In one embodiment of the foregoing system, the browser application is further configured to: store the determined uniform resource identifier as a user-selectable entry in a browser history of the browser application.

A computer-readable storage medium having program instructions recorded thereon that, when executed by at least one processor of a computing device, perform a method. The method includes: detecting a first user interaction that causes a browser application to navigate to a first web page, the first web page associated with a first uniform resource identifier; detecting that the browser application has been redirected to a second web page, the second web page associated with a second uniform resource identifier; applying at least one rule to the first uniform resource identifier and the second uniform resource identifier to determine which of the first uniform resource identifier and the second uniform resource identifier is to be associated with the second web page; detecting a second user interaction to store a reference to the second web page; and responsive to detecting the second user interaction to store the reference to the second web page, generating and storing the reference that associates at least the determined uniform resource identifier with the second web page.

In one embodiment of the foregoing computer-readable storage medium, the at least one rule comprises at least one of: a first rule that: determines whether a first response message received in response to navigating to the first web page comprises a first metadata tag that indicates that the first uniform resource identifier is to be excluded from association with the second web page; and determines whether a second response message received in response to navigating to the second web page comprises a second metadata tag that indicates that the second uniform resource identifier is to be excluded from association with the second web page; or a second rule that: determines whether the first uniform resource identifier and the second uniform resource identifier match a predetermined pattern or match a particular uniform resource identifier included in a predetermined list of uniform resource identifiers; excludes the first uniform resource identifier from being associated with the second web page responsive to determining that the first uniform resource identifier matches the predetermined pattern or matches the particular uniform resource identifier; and excludes the second uniform resource identifier from being associated with the second web page responsive to determining that the second uniform resource identifier matches the predetermined pattern or matches the particular uniform resource identifier.

In one embodiment of the foregoing computer-readable storage medium, detecting the second user interaction to store the reference to the second web page comprises:

detecting user input that selects the second uniform resource identifier and performs a copy operation with respect to the second uniform resource identifier; wherein said generating and storing the reference that associates at least the determined uniform resource identifier with the second web page comprises, providing the determined uniform resource identifier to a buffer utilized by a clipboard process of an operating system executing on the computing device, and wherein the reference comprises the determined uniform resource identifier provided to and stored in the buffer.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method implemented by a computing device, comprising:
    detecting a first user interaction that causes a browser application to navigate to a first web page, the first web page associated with a first uniform resource identifier;
    detecting that the browser application has been redirected from the first web page to a second web page by a redirect message received by the browser application, the second web page associated with a second uniform resource identifier specified by the redirect message;
    detecting a second user interaction to store a reference to the second web page;
    responsive to detecting the second user interaction to store the reference to the second web page, determining whether the first uniform resource identifier is identical to the second uniform resource identifier;
        responsive to determining that the first uniform resource identifier is not identical to the second uniform resource identifier specified by the redirect message, generating and storing a first reference that associates both the first uniform resource identifier and the second uniform resource identifier with the second web page as the reference to the second web page; and
    responsive to detecting a user interaction to access the reference to the second web page, displaying both the first uniform resource identifier and the second uniform resource identifier specified by the redirect message, wherein each of the first uniform resource identifier and the second uniform resource identifier is user-selectable to navigate to the second web page.

2. The method of claim 1, wherein said detecting the first user interaction comprises one of:
    detecting entry of the first uniform resource identifier into an address bar of the browser application;
    detecting selection of a hyperlink that causes the browser application to navigate to the first uniform resource identifier;
    detecting a third user interaction with a user interface element displayed via a third web page, the third user interaction causing the browser application to execute a script, the script causing the browser application to navigate to the first web page;
    detecting selection of a bookmark maintained by the browser application, the bookmark corresponding to the first uniform resource identifier; or
    detecting selection of a shortcut associated with the first uniform resource identifier.

3. The method of claim 1, wherein said detecting that the browser application has been redirected to the second web page comprises:
    providing a network request to a server based on the first uniform resource identifier; and
    receiving a network response from the server that specifies the second uniform resource identifier and a status code that indicates that the browser application is to redirect to the second uniform resource identifier.

4. The method of claim 1, wherein said detecting that the browser application has been redirected to the second web page comprises:
    detecting a refresh tag in a header of the first web page, the refresh tag associated with a content attribute value that has a predetermined relationship with a predetermined value and associated with the second uniform resource identifier.

5. The method of claim 1, wherein said detecting the second user interaction to store the reference to the second web page comprises:
    detecting that a user interface element of the browser application that causes a bookmark to be generated has been interacted with,
    wherein said generating and storing the first reference that associates both the first uniform resource identifier and the second uniform resource identifier with the second web page comprises,
        generating and storing the bookmark, the bookmark associating the second web page with both the first uniform resource identifier and the second uniform resource identifier, and
    wherein the reference comprises the bookmark.

6. The method of claim 1, wherein said detecting the second user interaction to store the reference to the second web page comprises:
    detecting user input that selects the second uniform resource identifier and performs a copy operation with respect to the second uniform resource identifier;
    wherein said generating and storing the reference that associates the first uniform resource identifier with the second web page comprises,
        providing the first uniform resource identifier to a buffer utilized by a clipboard process of an operating system executing on the computing device, and
    wherein the reference comprises the first uniform resource identifier provided to and stored in the buffer.

7. The method of claim 6, further comprising:
    providing the second uniform resource identifier to the buffer; and
    associating the second uniform resource identifier with the first uniform resource identifier,
    wherein both the first uniform resource identifier and the second uniform resource identifier are presentable as options for pasting during a paste operation.

8. The method of claim 1, further comprising:
    responsive to determining that the first uniform resource identifier is not identical to the second uniform resource identifier, storing the first uniform resource identifier as a user-selectable entry in a browser history of the browser application.

9. The method of claim 1, further comprising:
responsive to determining that the first uniform resource identifier is identical to the second uniform resource identifier:
- storing the first uniform resource identifier as a user-selectable entry in a browser history of the browser application;
- associating the second uniform resource identifier with the user-selectable entry, the user-selectable entry associated with a user interface element;
- detecting a selection of the user interface element; and
- responsive to detecting the selection of the user interface element, displaying both the first uniform resource identifier and the second uniform resource identifier, each of the first uniform resource identifier and the second uniform resource identifier is user-selectable.

10. A system, comprising:
at least one processor circuit; and
at least one memory that stores program code configured to be executed by the at least one processor circuit, the program code comprising:
a browser application configured to:
- detect a first user interaction that causes the browser application to navigate to a first web page, the first web page associated with a first uniform resource identifier;
- detect that the browser application has been redirected from the first web page to a second web page by a redirect message received by the browser application, the second web page associated with a second uniform resource identifier specified by the redirect message;
- detect a second user interaction to store a reference to the second web page;
- responsive to detecting the second user interaction to store the reference to the second web page, determine whether the first uniform resource identifier is identical to the second uniform resource identifier;
- responsive to a determination that the first uniform resource identifier is not identical to the second uniform resource identifier specified by the redirect message, generating and storing a first reference that associates both the first uniform resource identifier and the second uniform resource identifier with the second web page; and
- responsive to detecting a user interaction to access the reference to the second web page, displaying both the first uniform resource identifier and the second uniform resource identifier specified by the redirect message, wherein each of the first uniform resource identifier and the second uniform resource identifier is user-selectable to navigate to the second web page.

11. The system of claim 10, wherein the browser application is further configured to:
- detect entry of the first uniform resource identifier into an address bar of the browser application;
- detect selection of a hyperlink that causes the browser application to navigate to the first uniform resource identifier;
- detect a third user interaction with a user interface element displayed via a third web page, the third user interaction causing the browser application to execute a script, the script causing the browser application to navigate to the first web page;
- detect selection of a bookmark maintained by the browser application, the bookmark corresponding to the first uniform resource identifier; or
- detect selection of a shortcut associated with the first uniform resource identifier.

12. The system of claim 10, wherein the browser application is further configured to:
responsive to the determination that the first uniform resource identifier is not identical to the second uniform resource identifier, store the first uniform resource identifier as a user-selectable entry in a browser history of the browser application.

13. The system of claim 10, wherein the browser application is further configured to:
- provide a network request to a server based on the first uniform resource identifier; and
- receive a network response from the server that specifies the second uniform resource identifier and a status code that indicates that the browser application is to redirect to the second uniform resource identifier.

14. The system of claim 10, wherein the browser application is further configured to:
detect a refresh tag in a header of the first web page, the refresh tag associated with a content attribute value that has a predetermined relationship with a predetermined value and associated with the second uniform resource identifier.

15. A computer-readable storage medium having program instructions recorded thereon that, when executed by at least one processor of a computing device, perform a method, the method comprising:
- detecting a first user interaction that causes a browser application to navigate to a first web page, the first web page associated with a first uniform resource identifier;
- detecting that the browser application has been redirected from the first web page to a second web page by a redirect message received by the browser application, the second web page associated with a second uniform resource identifier specified by the redirect message;
- detecting a second user interaction to store a reference to the second web page;
- responsive to detecting the second user interaction to store the reference to the second web page, determining whether the first uniform resource identifier is identical to the second uniform resource identifier;
- responsive to determining that the first uniform resource identifier is not identical to the second uniform resource identifier specified by the redirect message, generating and storing a first reference that associates both the first uniform resource identifier and the second uniform resource identifier with the second web page as the reference to the second web page; and
- responsive to detecting a user interaction to access the reference to the second web page, displaying both the first uniform resource identifier and the second uniform resource identifier specified by the redirect message, wherein each of the first uniform resource identifier and the second uniform resource identifier is user-selectable to navigate to the second web page.

16. The computer-readable storage medium of claim 15, wherein said detecting the second user interaction to store the reference to the second web page comprises:
detecting user input that selects the second uniform resource identifier and performs a copy operation with respect to the second uniform resource identifier;

wherein said generating and storing the reference that associates the first uniform resource identifier with the second web page comprises providing the first uniform resource identifier to a buffer utilized by a clipboard process of an operating system executing on the computing device, and wherein the reference comprises the first uniform resource identifier provided to and stored in the buffer.

17. The computer-readable storage medium of claim 15, wherein said detecting that the browser application has been redirected to the second web page comprises:

providing a network request to a server based on the first uniform resource identifier; and receiving a network response from the server that specifies the second uniform resource identifier and a status code that indicates that the browser application is to redirect to the second uniform resource identifier.

18. The computer-readable storage medium of claim 15, wherein said detecting that the browser application has been redirected to the second web page comprises:

detecting a refresh tag in a header of the first web page, the refresh tag associated with a content attribute value that has a predetermined relationship with a predetermined value and associated with the second uniform resource identifier.

19. The computer-readable storage medium of claim 15, the method further comprising:

responsive to determining that the first uniform resource identifier is not identical to the second uniform resource identifier, storing the first uniform resource identifier as a user-selectable entry in a browser history of the browser application.

* * * * *